United States Patent
Maekawa

(10) Patent No.: US 12,210,101 B2
(45) Date of Patent: Jan. 28, 2025

(54) PHOTOELECTRIC CONVERSION DEVICE, PHOTODETECTION SYSTEM, AND MOVABLE OBJECT

(71) Applicant: CANON KABUSHIKI KAISHA, Tokyo (JP)

(72) Inventor: Shintaro Maekawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 17/572,175

(22) Filed: Jan. 10, 2022

(65) Prior Publication Data
US 2022/0236420 A1   Jul. 28, 2022

(30) Foreign Application Priority Data
Jan. 22, 2021 (JP) ................. 2021-008596

(51) Int. Cl.
| | | |
|---|---|---|
| G01S 17/89 | (2020.01) |
| G01S 7/481 | (2006.01) |
| G01S 7/4861 | (2020.01) |
| G01S 17/931 | (2020.01) |
| H04N 25/79 | (2023.01) |

(52) U.S. Cl.
CPC ............ *G01S 17/89* (2013.01); *G01S 7/4816* (2013.01); *G01S 7/4861* (2013.01); *G01S 17/931* (2020.01); *H04N 25/79* (2023.01)

(58) Field of Classification Search
CPC ...... G01S 17/89; G01S 17/931; G01S 7/4816; G01S 7/5861; H04N 25/79
See application file for complete search history.

(56) References Cited

U.S. PATENT DOCUMENTS

| | | | |
|---|---|---|---|
| 2016/0219234 A1* | 7/2016 | Nishihara | H04N 25/78 |
| 2019/0305146 A1* | 10/2019 | Kuroda | H01L 31/107 |
| 2022/0163645 A1* | 5/2022 | Jessenig | G01S 7/4873 |

FOREIGN PATENT DOCUMENTS

| | | |
|---|---|---|
| JP | H01166666 A | 6/1989 |
| JP | 2019009768 A | 1/2019 |
| JP | 2019186598 A | 10/2019 |

\* cited by examiner

*Primary Examiner* — Girumsew Wendmagegn
(74) *Attorney, Agent, or Firm* — Canon U.S.A., Inc. IP Division

(57) ABSTRACT

A device according to an embodiment of the present disclosure includes a photodiode, a generation circuit that generates a detection pulse based on an output generated by incidence of photon on the photodiode, a counter that counts the detection pulse and outputs a count value of a plurality of bits, and a determination circuit that outputs a determination signal indicating that the count value exceeds a predetermined threshold value based on a transition of any one bit of the counter.

20 Claims, 23 Drawing Sheets

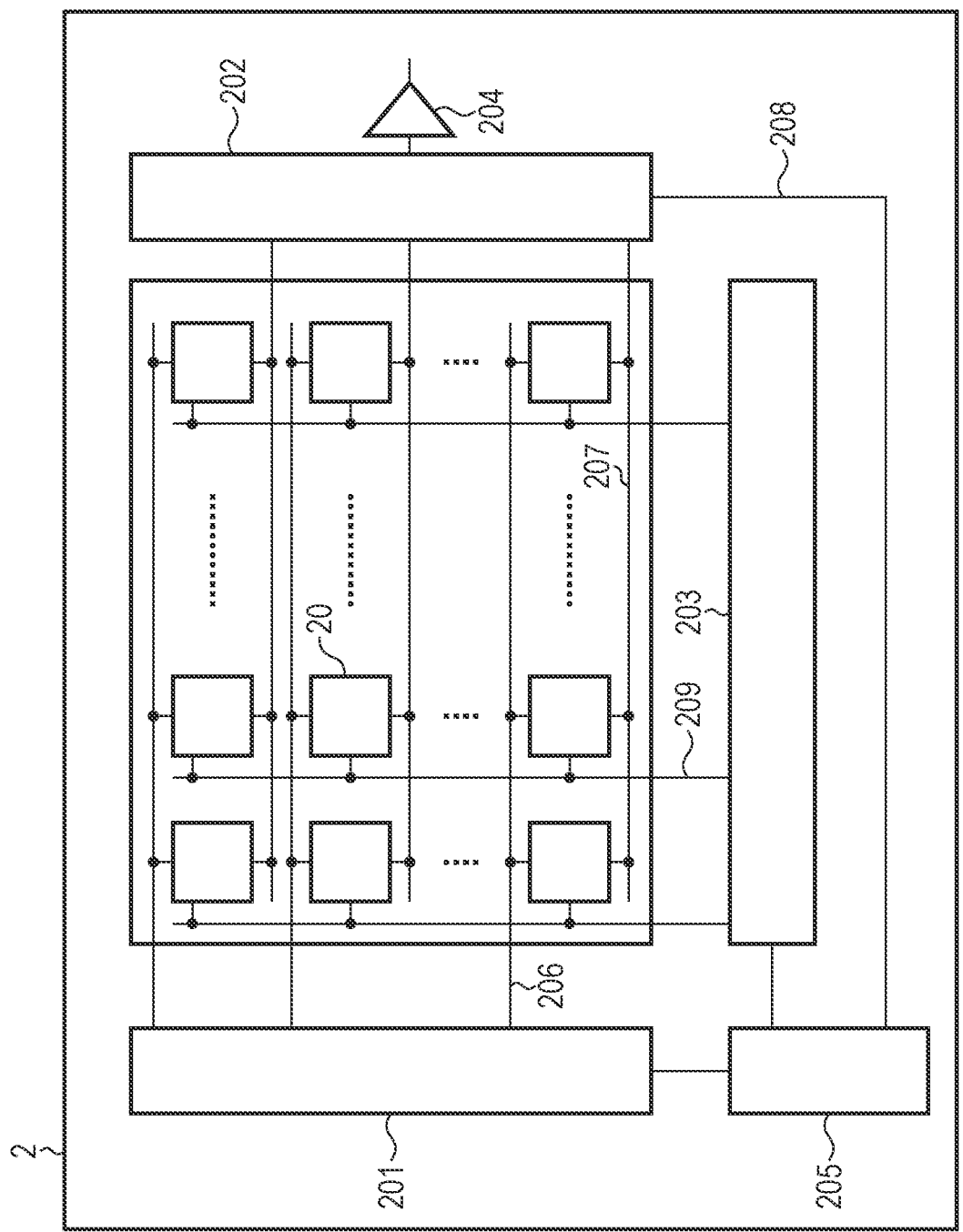

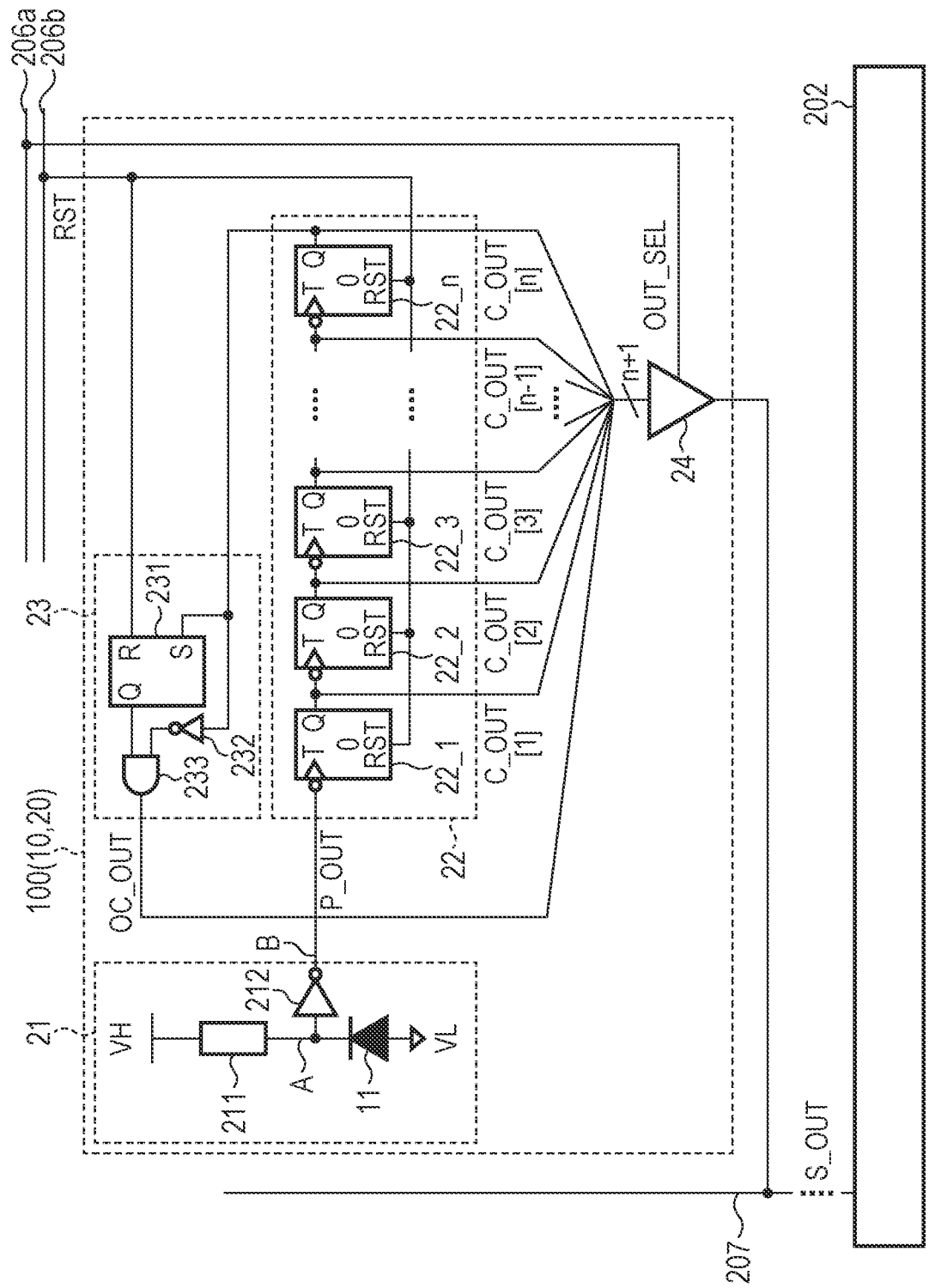

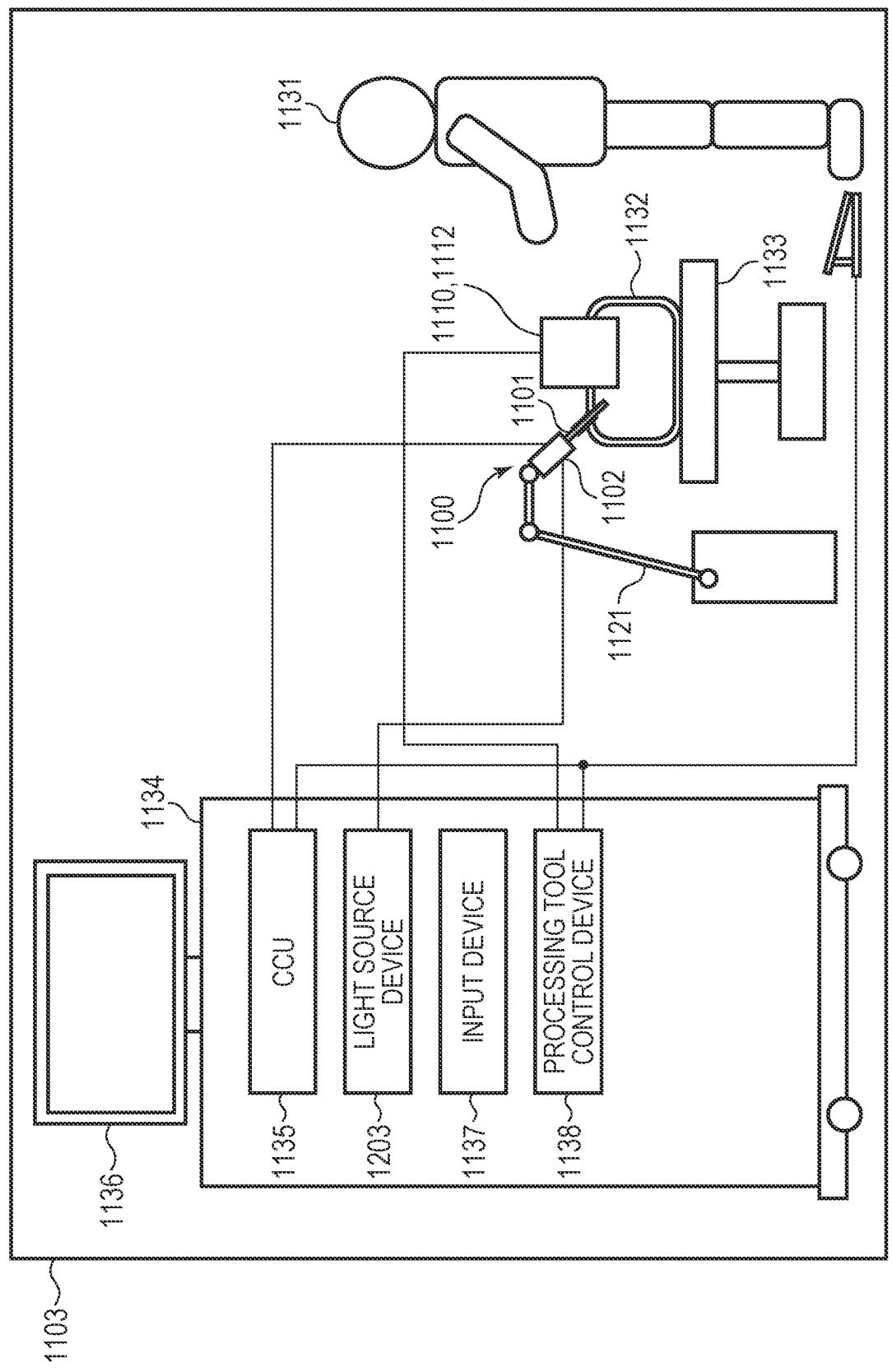

PHOTOELECTRIC CONVERSION DEVICE, PHOTODETECTION SYSTEM, AND MOVABLE OBJECT

BACKGROUND

Field of the Disclosure

The aspect of the embodiments relates to a photoelectric conversion device, a photodetection system, and a movable object.

Description of the Related Art

There is known a photon counting type photoelectric conversion device using an avalanche photodiode (APD). In a photon counting type photoelectric conversion device, the number of photons that can be counted is limited to the count upper limit value of a counter mounted therein. The photoelectric conversion device described in Japanese Patent Application Laid-Open No. 2019-9768 executes a predetermined operation such as stopping the avalanche current when the count value of the counter exceeds a threshold value.

However, in the photoelectric conversion device described in Japanese Patent Application Laid-Open No. 2019-9768, all the bit values of the counter are detected in order to compare the value with the threshold value, and that the circuit scale becomes larger.

SUMMARY OF THE DISCLOSURE

According to an embodiment of the disclosure, there is provided a device including a photodiode, a generation circuit a signal that generates a detection pulse based on an output generated by incidence of photon on the photodiode, a counter that counts the detection pulse and outputs a count value of a plurality of bits, and a determination circuit that outputs a determination signal indicating that the count value exceeds a predetermined threshold value based on a transition of any one bit of the counter, wherein the determination circuit determines that the count value exceeds the threshold value when a value of any one bit of the counter transitions from "1" to "0".

Further features of the disclosure will become apparent from the following description of exemplary embodiments with reference to the attached drawings.

BRIEF DESCRIPTION OF THE DRAWINGS

FIG. 3 is a diagram illustrating an example of an arrangement of a circuit board according to the first embodiment.

FIG. 4 is a block diagram of a pixel circuit according to the first embodiment.

FIG. 19 is a schematic view of an endoscopic surgical system according to a seventh embodiment.

DESCRIPTION OF THE EMBODIMENTS

Figure 1:
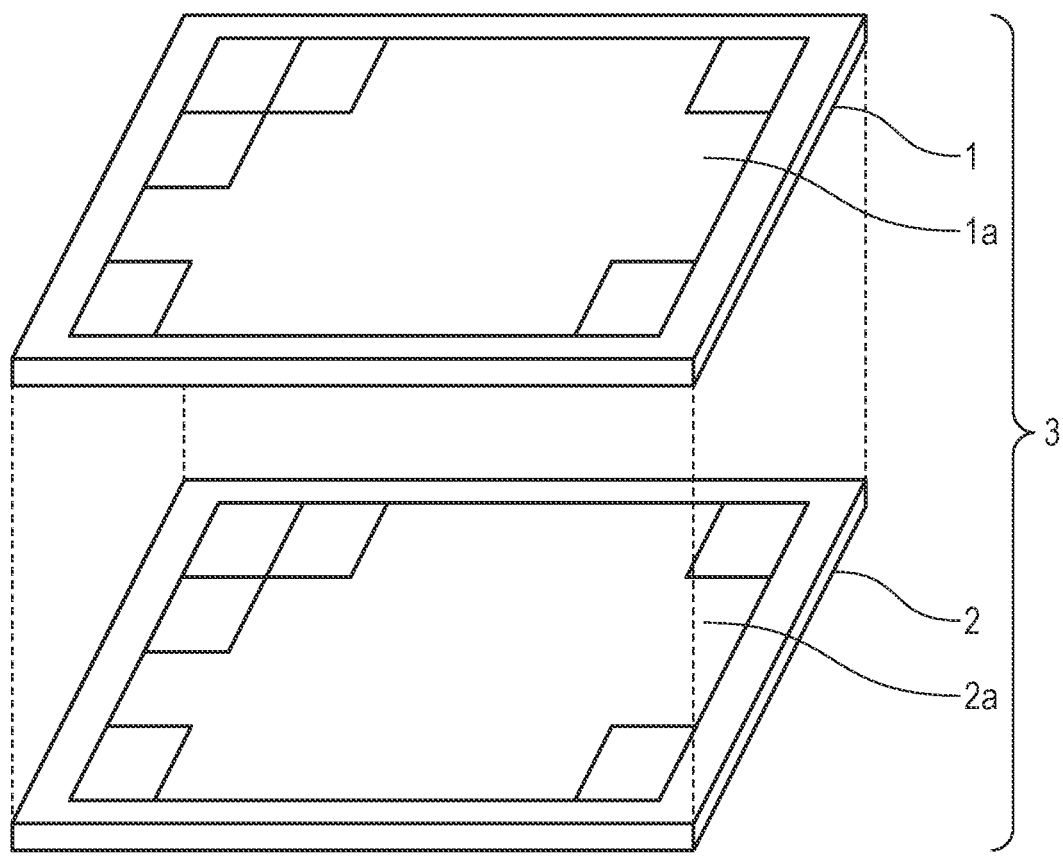
FIG. 1 is a schematic diagram of a photoelectric conversion device according to a first embodiment.

Hereinafter, embodiments of the disclosure will be described with reference to the drawings. The following embodiments are intended to embody the technical idea of the disclosure and do not limit the disclosure. The sizes and positional relationships of the members shown in the drawings may be exaggerated for clarity of description. In the following description, the same components are denoted by the same reference numerals, and description thereof may be omitted.

First Embodiment

A configuration of a photoelectric conversion device according to the present embodiment will be described with references to FIG. 1 to FIG. 4. The photoelectric conversion device has SPAD pixels including avalanche photodiodes (hereinafter referred to as APD). The conductivity type of charges used as signal charges among charge pairs generated in the APD is called a first conductivity type. The first conductivity type refers to a conductivity type in which a charge having the same polarity as the signal charge is used as a majority carrier. A conductivity type opposite to the first conductivity type is called a second conductivity type. Although an example in which the signal charge is an electron and the first conductivity type is N-type and the second conductivity type is P-type will be described below, the signal charge may be a hole, the first conductivity type may be P-type, and the second conductivity type may be N-type.

In the present specification, "plan view" refers to viewing from a direction perpendicular to a light incident surface of a semiconductor substrate, which will be described later. The "cross section" refers to a surface in a direction perpendicular to the light incident surface of the sensor substrate 1. When the light incident surface of the semiconductor layer is a rough surface when viewed microscopically, a plan view is defined based on the light incident surface of the semiconductor layer when viewed macroscopically. The "depth direction" is a direction from the light incident surface (first surface) of the sensor substrate 1 toward the surface (second surface) on which the circuit board 2 is arranged.

FIG. 1 is a schematic diagram of a photoelectric conversion device according to the present embodiment, illustrating a configuration of a stacked photoelectric conversion device 3. The photoelectric conversion device 3 includes a sensor substrate (first substrate) 1 and a circuit board (second substrate) 2 stacked on each other, and the sensor substrate 1 and the circuit board 2 are electrically connected to each other. The photoelectric conversion device in the present embodiment is a back-illuminated type photoelectric conversion device in which light is incident from a first surface of a sensor substrate 1 and a circuit board 2 is disposed on a second surface of the sensor substrate 1.

The sensor substrate 1 has a first semiconductor layer having photoelectric conversion elements described later and a first wiring structure. The circuit board 2 has a second semiconductor layer having a circuit such as a signal processing unit described later and a second wiring structure. The photoelectric conversion device 3 is formed by laminating the second semiconductor layer, the second wiring structure, the first wiring structure, and the first semiconductor layer in this order.

In the following description, the sensor substrate 1 and the circuit board 2 may be diced chips, but are not limited to chips. For example, each substrate may be a wafer. The substrates may be diced after being stacked in a wafer state, or chips may be stacked and bonded after being formed into chips. The sensor substrate 1 is provided with a pixel region 1a, and the circuit board 2 is provided with a circuit region 2a for processing signals detected by the pixel region 1a.

Figure 2:
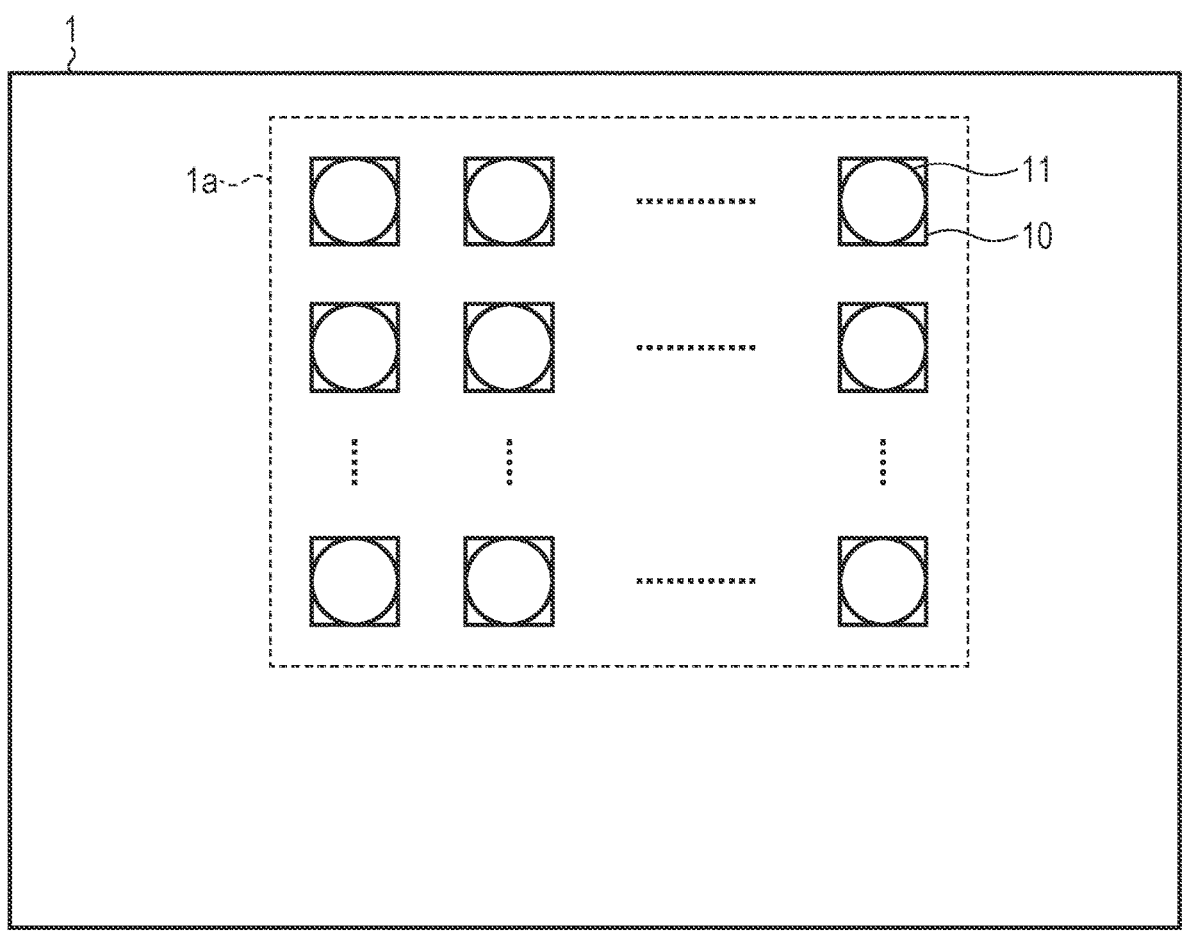
FIG. 2 is a diagram illustrating an example of an arrangement of sensor substrates according to the first embodiment.

FIG. 2 is a diagram illustrating an arrangement example of the sensor substrate 1. The plurality of pixels 10 each include an APD 11 and are arranged in a two-dimensional array in plan view to form a pixel region 1a.

The pixel 10 is typically a pixel for forming an image, but when used in a TOF (Time of Flight), the pixel 10 does not need to form an image. That is, the pixel 10 may be a pixel for measuring the time at which light reaches and the amount of light.

FIG. 3 is a diagram illustrating an example of an arrangement of the circuit board 2. A signal processing unit 20, a vertical scanning circuit 201, a readout circuit 202, a horizontal scanning circuit 203, an output circuit 204, a control pulse generation circuit 205, a scanning line 206, a signal line 207, a control line 208, and a scanning line 209 are formed on the circuit board 2. A plurality of signal processing units 20 are arranged in a region overlapping the pixel region 1a in FIG. 2 in plan view. Further, the vertical scanning circuit 201, the readout circuit 202, the horizontal scanning circuit 203, the output circuit 204, and the control pulse generation circuit 205 are arranged so as to overlap the region between the edge of the sensor substrate 1 and the end portion of the pixel region 1a in the plan view in FIG. 2. That is, the sensor substrate 1 has a pixel region 1a and a non-pixel region arranged around the pixel region 1a, and a vertical scanning circuit 201, a readout circuit 202, a horizontal scanning circuit 203, an output circuit 204, and a control pulse generation circuit 205 are arranged in a region overlapping the non-pixel region in plan view.

The signal processing units 20 are electrically connected to each other via connection wirings provided for the respective pixels 10, and are arranged in a two-dimensional array in plan view similarly to the pixels 10. The signal processing unit 20 includes a binary counter that counts photons incident on the pixel 10.

The vertical scanning circuit 201 receives the control pulse supplied from the control pulse generation circuit 205, and supplies the control pulse to the signal processing unit 20 corresponding to the pixels 10 in each row via the scanning line 206. The vertical scanning circuit 201 may be configured by a logic circuit such as a shift register or an address decoder.

The readout circuit 202 reads the count value of the digital signal from the signal processing unit 20 in each row via the signal line 207, and outputs the output signal to the external signal processing circuit (signal processing device) of the photoelectric conversion device 3 via the output circuit 204. The readout circuit 202 may also have a function of a signal processing circuit for correcting a count value or the like. The horizontal scanning circuit 203 receives a control pulse from the control pulse generation circuit 205 via the control line 208, and sequentially scans the scanning lines 209. Thus, the signal processing units 20 of the respective columns are sequentially selected, and the count values are read to the readout circuit 202 from the memory (binary counter) of the signal processing unit 20.

In FIG. 2, the array of photoelectric conversion elements in the pixel region may be arranged one-dimensionally. In addition, even in a configuration in which one pixel is provided, the effect of the disclosure can be achieved, and a configuration in which one pixel is provided can also be included in the disclosure. In the photoelectric conversion device having a plurality of pixels, the effect of suppressing the circuit scale according to the present embodiment becomes more significant. The signal processing unit 20 does not necessarily have to be provided one by one in every pixel 10. For example, one signal processing unit 20 may be shared by a plurality of pixels 10 and signal processing may be performed sequentially.

FIG. 4 is a block diagram of the pixel circuit 100 according to the present embodiment. In FIG. 4, the pixel 10 and the signal processing unit 20 are shown together as a pixel circuit 100. The pixel circuit 100 includes a photon detection circuit 21, a binary counter 22, a determination circuit 23, and a buffer circuit 24. The APD 11 of the photon detection circuit 21 is provided on the sensor substrate 1, and the other components are provided on the circuit board 2. In the following description, values of digital signals such as the count value C_OUT are expressed in binary form.

The photon detection circuit 21 includes an APD 11, a quench element 211, and a waveform shaping circuit 212.

The APD 11 generates charge pairs corresponding to incident light by photoelectric conversion. A voltage VL (first voltage) is supplied to the anode of the APD 11. A voltage VH (second voltage) higher than the voltage VL supplied to the anode is supplied to the cathode of the APD 11. A reverse bias voltage is applied to the anode and the cathode, and the APD 11 enters a state capable of avalanche multiplication.

When a photon enters the APD 11 in a state where the reverse bias voltage is supplied, charges generated by the photon cause avalanche multiplication, and an avalanche current is generated.

Depending on the reverse bias voltage, the APD 11 may operate in a Geiger mode or a linear mode. In the Geiger mode, the potential difference between the anode and the cathode is larger than the breakdown voltage. The linear mode is an operation in which the potential difference between the anode and the cathode is near or below the breakdown voltage. The APD operating in Geiger mode is particularly referred to as SPAD. As an example, the voltage VL (first voltage) may be −30V, and the voltage VH (second voltage) may be 1V. The APD 11 may operate in the linear mode or the Geiger mode. When the APD 11 operates as an SPAD, the potential difference becomes larger than that of the APD 11 in the linear mode, and the effect of the breakdown voltage becomes significant.

The quench element 211 is provided between the power supply line for supplying the voltage VH and the cathode of the APD 11. The quench element 211 functions as a load circuit (quenching circuit) at the time of signal multiplication by avalanche multiplication, and the quench element 211 functions to suppress avalanche multiplication by suppressing the voltage supplied to the APD 11 (quenching operation). Further, the quench element 211 has a function of returning the voltage supplied to the APD 11 to the voltage VH by flowing the current corresponding to the voltage drop in the quenching operation (recharging operation).

The waveform shaping circuit 212 functions as a signal generation circuit that generates a detection pulse based on an output generated by incidence of photon. That is, the waveform shaping circuit 212 shapes the change in the potential of the cathode of the APD 11 obtained at the time of photon detection, and outputs a rectangular pulse signal (detection pulse) POUT. An inverter circuit, for example, is used as the waveform shaping circuit 212. Although FIG. 4 shows an example in which one inverter is used as the waveform shaping circuit 212, a circuit in which a plurality of inverters are connected in series may be used. Other circuits having a waveform shaping effect may also be used.

The binary counter 22 includes n numbers of T-type flip-flops 22_1 to 22_n, and the binary counter 22 can hold and output n-bit count values C_OUT[I] to C_OUT[n]. Here, "n" is a natural number of two or more, and the count values C_OUT[1] to C_OUT[n] are a plurality of bits. The pulse signal P_OUT is input from the waveform shaping circuit 212 to the input node T of the first stage T-type flip-flop 22_1, and the count value C_OUT[1] of the least significant bit (LSB) is output from the output node Q. The count value C_OUT[1] is input to the input node T of the second stage T-type flip-flop 222, and the count value C_OUT[2] is output from the output node Q. Similarly, the count value C_OUT[n−1] is input to the input node T of the n-th stage T-type flip-flop 22_n, and the count value C_OUT[n] of the most significant bit (MSB: Most Significant Bit) is output from the output node Q. A reset signal RST is input from the scanning line 206b to the reset nodes RST of the T-type flip-flops 22_1 to 22_n.

The determination circuit 23 includes an RS latch circuit 231, an inverter circuit 232, and a logic gate circuit 233, and can determine whether or not the count value C_OUT exceeds a threshold value. The count value C_OUT[n] of MSB is input to the input node S of the RS latch circuit 231, and the reset signal RST is input to the reset node R from the scanning line 206b. The signal from the output node Q of the RS latch circuit 231 is input to the first input node of the logic gate circuit 233, and the inverted value of the count value C_OUT[n] of the MSB is input to the second input node from the inverter circuit 232. The output node of the logic gate circuit 233 outputs a determination flag (determination signal) OC_OUT indicating whether or not count value C_OUT exceeds a threshold value. In the present embodiment, the determination circuit 23 transits the determination flag OC_OUT from "O" to "1" at the timing when the count value C_OUT[n] of the MSB of the binary counter 22 transits from "1" to "0". The count value C_OUT [n] of the MSB transits from "1" to "O" when the pulse signal P_OUT is input to the binary counter 22 in a state where the count values C_OUT[1] to [n] are the maximum value "1 . . . 1". Therefore, by monitoring the count value C_OUT[n] of the MSB, it is possible to determine that the count value C_OUT overflows. Since the RS latch circuit 231 of the determination circuit 23 in the present embodiment can be configured by fewer transistors, it is possible to suppress the circuit scale more effectively. If a circuit for detecting all bits of the count values C_OUT[1] to C_OUT [n] is configured, at least (n×2) transistors are required. The greater the number of bits n of the binary counter 22 is, the more significant the effect of the present embodiment is.

The buffer circuit 24 is a tri-state buffer, and includes an input node and an output node of (N+1) bits, respectively. The 1-bit determination flag OC_OUT is added to the N-bit count value C_OUT and is input to the input node of the buffer circuit 24. An output signal S_OUT of (N+1) bits is output from the output node of the buffer circuit 24. The output signal S_OUT is output to the readout circuit 202 via the signal line 207. When the control signal OUT_SEL is at high level, the buffer circuit 24 outputs the output signal S_OUT from the output node. When the control signal OUT_SEL is at low level, the buffer circuit 24 sets the output node to high impedance.

Figure 5A:
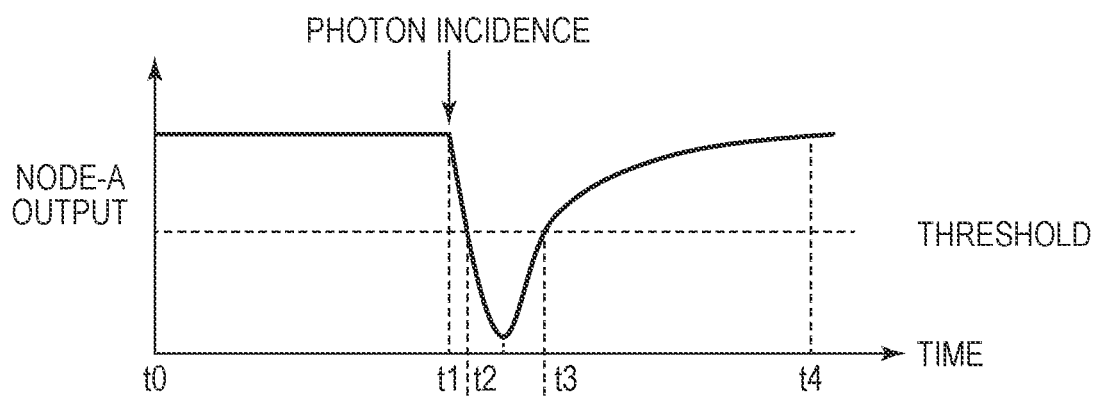
FIGS. 5A and 5B are diagrams illustrating the relationship between the operation of the APD and the output signal according to the first embodiment.
Figure 5B:
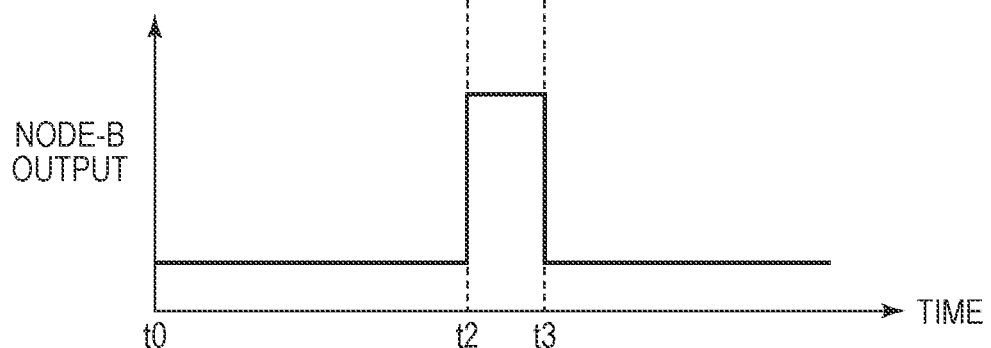

FIGS. 5A and 5B are diagrams illustrating the relationship between the operation of the APD 11 and the output signal in the present embodiment. In the case where the input side of the waveform shaping circuit 212 is the node A and the output side thereof is the node B, FIG. 5A illustrates the waveform change of the node A, and FIG. 5B illustrates the waveform change of the node B.

Between the time t0 and the time t1, the reverse bias voltage VH-VL is applied to the APD 11. When a photon enters the APD 11 at the time t1, avalanche multiplication occurs in the APD 11, an avalanche multiplication current flows in the quench element 211, and the voltage of the node A drops. When the voltage drop further increases and the potential difference applied to the APD 11 decreases, the avalanche multiplication of the APD 11 stops at the time t2, and the voltage level of the node A does not drop by a certain value or more. Thereafter, between the time t2 and the time t4, a current that compensates the voltage drop from the voltage VL flows to the node A, and at the time t4, the node A is settled to the original voltage level. At this time, when the voltage level of the node A exceeds the threshold value of the waveform shaping circuit 212 from the time t2 to the time t3, the node B becomes high level. That is, the voltage waveform of the node A is shaped into a waveform by the waveform shaping circuit 212, and a rectangular-wave pulse signal P_OUT is output from the node B.

Figure 6:
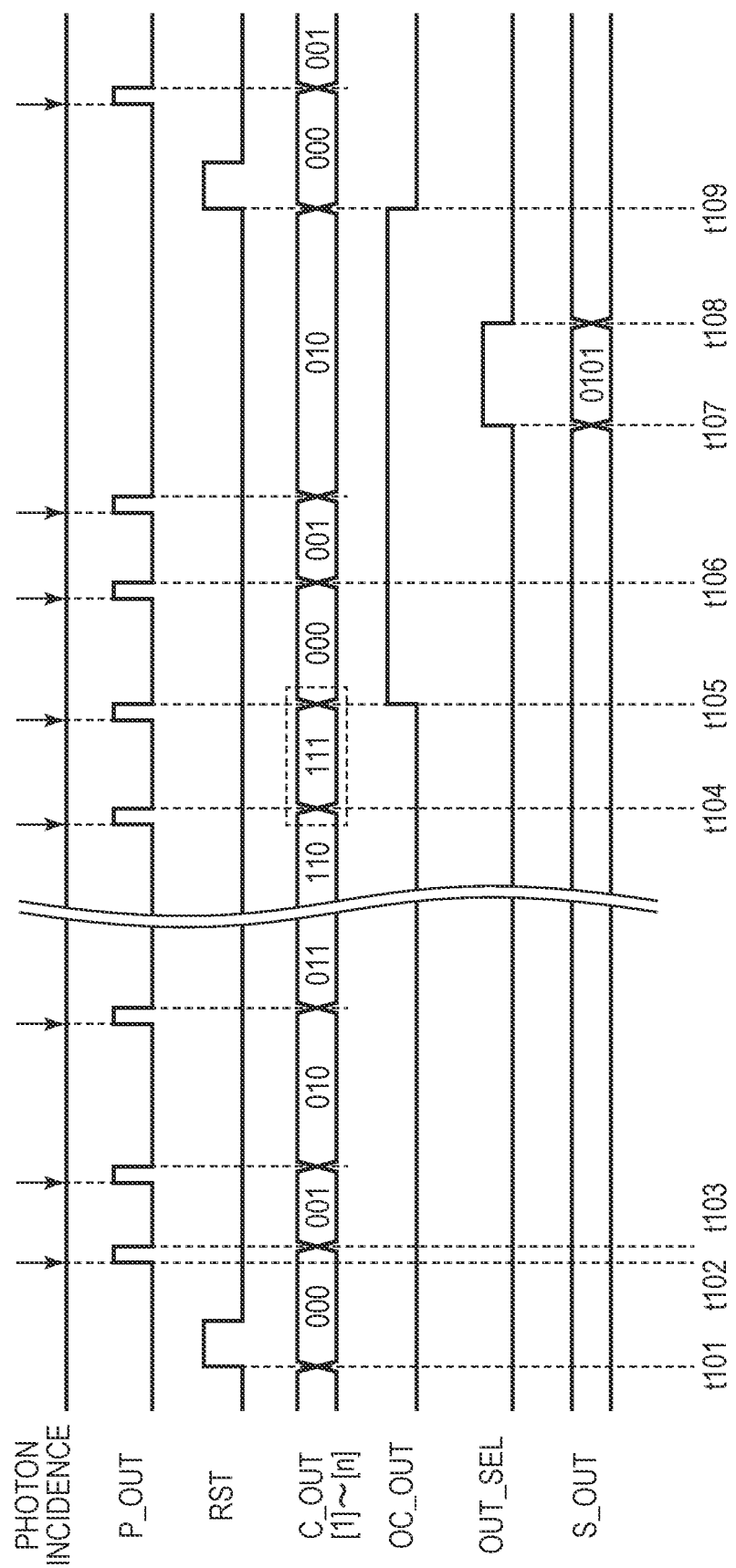
FIG. 6 is a timing chart illustrating the operation of the photoelectric conversion device according to the first embodiment.

FIG. 6 is a timing chart illustrating the operation of the photoelectric conversion device according to the present embodiment when the count value C_OUT exceeds the threshold value "111". FIG. 6 shows temporal changes of photon incidence, the pulse signal POUT, the reset signal RST, the count values C_OUT[1] to [n], the determination flag OC_OUT, the control signal OUT_SEL, and the output signal S_OUT. Here, for simplicity of description, it is assumed that "n" is three (n=3), and the T-type flip-flops 221 to 223, and the count values C_OUT[1] to C_OUT[3] are shown as an example.

When the reset signal RST transits from low level to high level at the time t101, all the T-type flip-flops 221 to 22_3 of the binary counter 22 are reset, and the count value C_OUT becomes "000". The RS latch circuit 231 of the determination circuit 23 is also reset, and the determination flag OC_OUT becomes low level.

When a photon enters the APD 11 at the time t102, avalanche multiplication occurs in the APD 11, and the pulse signal POUT transits from low level to high level. When the pulse signal POUT transits from high level to low level at the time t103, the output node Q of the T-type flip-flop 22_1 transits from low level to high level. That is, the count value C_OUT[1] of the LSB transits from "0" to "1", and the 3-bit count value C_OUT becomes "001".

Thereafter, every time a photon enters the APD 11, the count value C_OUT repeatedly counts up, and the count value C_OUT becomes "111" at the time t104. Since the count value C_OUT[3] of the MSB becomes "1", the input node S of the RS latch circuit 231 of the determination circuit 23 becomes high level, and the output node Q of the RS latch circuit 231 and the first input node of the logic gate circuit 233 become high level. On the other hand, the inverted value "0" of the count value C_OUT[3] of the MSB is input to the second input node of the logic gate circuit 233. Therefore, the determination flag OC_OUT at the output node of the logic gate circuit 233 maintains low level indicating that the count value C_OUT is equal to or less than the threshold value, that is, does not exceed the threshold value.

At the time t105, when the pulse signal POUT transits from high level to low level in response to photon incidence, the 3-bit count value C_OUT transits from "111" to "000". Since the count value C_OUT[3] of the MSB transitions from "1" to "0", the input node S of the RS latch circuit 231 of the determination circuit 23 is at low level, but the output node Q and the first input node of the logic gate circuit 233 are maintained at high level. The inverted value "1" of the count value C_OUT[3] of the MSB is input to the second input node of the logic gate circuit 233. Therefore, the determination flag OC_OUT at the output node of the logic gate circuit 233 transits to high level indicating that the count value C_OUT exceeds the threshold value.

After the time t106, the count value C_OUT repeats counting up from "000" in response to photon incidence. The determination flag OC_OUT maintains high level.

At the times t107 to t108, the control signal OUT_SEL becomes high level, and the buffer circuit 24 latches "010" of the count value C_OUT at the present time. The buffer circuit 24 adds the determination flag OC_OUT to the LSB of the count value C_OUT, and outputs "0101" as the 4-bit output signal S_OUT. Since the LSB of the output signal S_OUT, that is, the determination flag OC_OUT is "1", the signal processing circuit provided outside or inside the photoelectric conversion device 3 can determine that the count value C_OUT of 3 bits overflows. In this case, the signal processing circuit may invalidate "010" of the count value C_OUT and correct the count value C_OUT to the maximum value "111". This makes it possible to avoid undesired operation during overflow. The signal processing circuit may add the determination flag OC_OUT to the MSB of the count value C_OUT, and use the output signal S_OUT "10100" of 4 bits as the count value C_OUT. In this case, the number of bits of the count value C_OUT can be substantially extended from 3 bits to 4 bits.

At the time t109, the reset signal RST transits from low level to high level, and all the T-type flip-flops 22_1 to 22_3 of binary counter 22 are reset, and count value C_OUT becomes "000". The RS latch circuit 231 of the determination circuit 23 is also reset, and the determination flag OC_OUT becomes low level.

Figure 7:
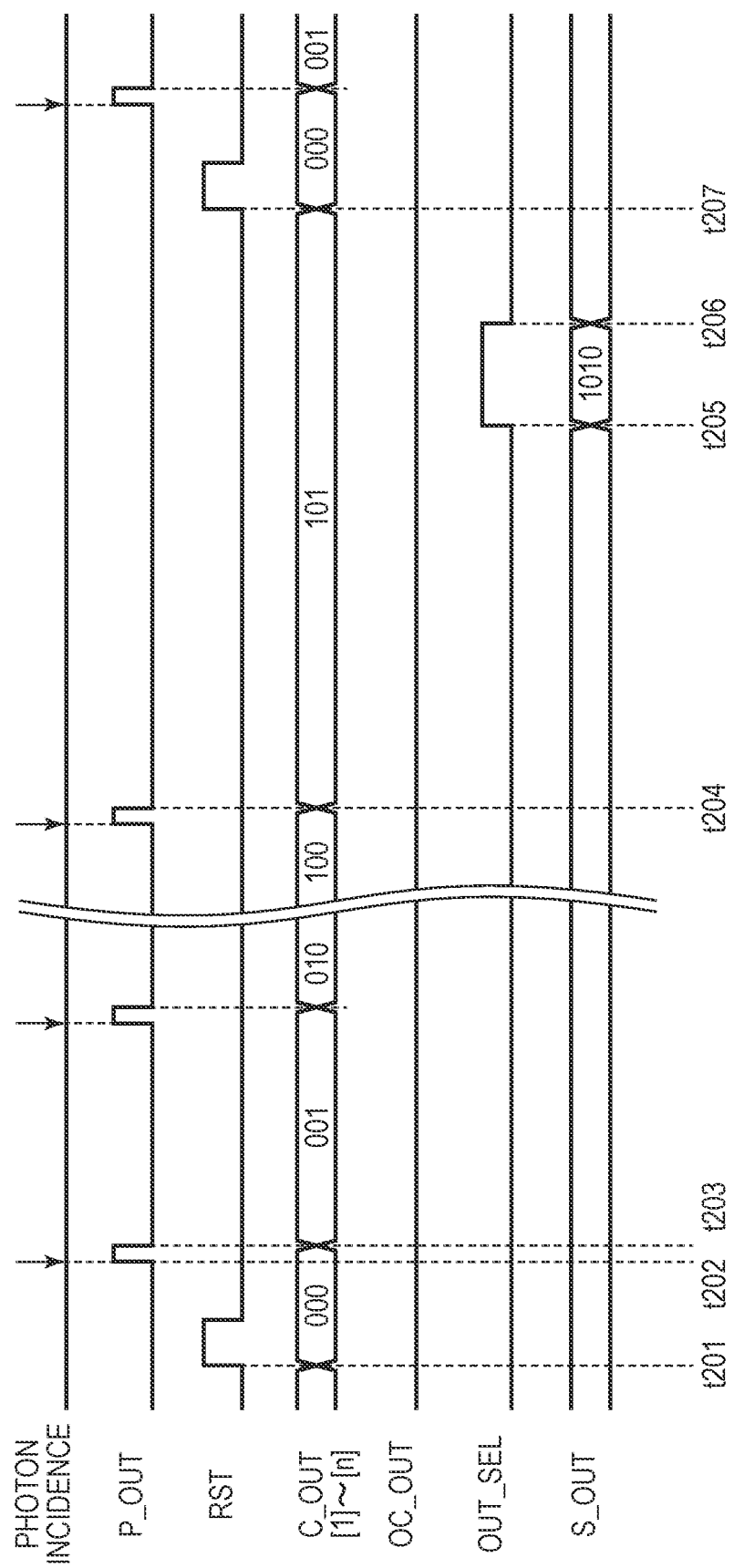
FIG. 7 is a timing chart illustrating the operation of the photoelectric conversion device according to the first embodiment.

FIG. 7 is a timing chart illustrating the operation of the photoelectric conversion device according to the present embodiment, and shows the operation when the count value C_OUT does not exceed the threshold value "111".

At the time t201, the reset signal RST transitions from low level to high level, count value C_OUT is reset to "000", and the determination flag OC_OUT becomes low level.

When a photon enters the APD 11 at the time t202, the pulse signal P_OUT transits from low level to high level. When the pulse signal P_OUT transits from high level to low level at the time t203, the count value C_OUT[1] of the LSB transits from "0" to "1". Thus, the 3-bit count value C_OUT becomes "001".

Thereafter, every time a photon enters the APD 11, the count value C_OUT repeatedly counts up, and the count value C_OUT becomes "101" at the time t204.

At the times t205 to t206, the control signal OUT_SEL becomes high level, and the buffer circuit 24 latches "101" of the current count value C_OUT. At this time, the count value C_OUT[3] of the MSB remains "1". Therefore, the determination flag OC_OUT maintains low level indicating that the count value C_OUT does not exceed the threshold value. The buffer circuit 24 adds the determination flag OC_OUT to the LSB of the count value C_OUT, and outputs "1010" as the output signal S_OUT. Since the LSB of the output signal S_OUT is "0", the signal processing circuit provided outside or inside the photoelectric conversion device 3 determines that the count value C_OUT of 3 bits does not overflow and "101" of the count value C_OUT is valid.

At the time t207, the reset signal RST transits from low level to high level, all the T-type flip-flops 22_1 to 22_3 of binary counter 22 are reset, and the count value C_OUT becomes "000". The RS latch circuit 231 of the determination circuit 23 is also reset, and the determination flag OC_OUT maintains low level.

As described above, the photoelectric conversion device according to the present embodiment determines that the count value C OUT exceeds the threshold value based on the transition of any one bit of the binary counter 22. Since it is not necessary to detect all bits of the binary counter 22, the circuit scale can be reduced. In particular, by detecting that the MSB of the count value C_OUT has transited from "1" to "0", it is possible to determine that the count value C_OUT overflows while suppressing the circuit scale.

Further, the signal processing circuit that has received the count value C_OUT can determine whether or not the count value C_OUT is valid based on the determination flag OC_OUT, and can perform correction processing on the count value C_OUT at the time of overflow.

As will be described later, the threshold value is not necessarily limited to the maximum value of the count value C_OUT. That is, any one of the output nodes Q of the T-type flip-flops 22_1 to 22_n may be connected to the determination circuit 23.

Second Embodiment

Next, the photoelectric conversion device according to the present embodiment will be described. The photoelectric conversion device according to the present embodiment differs from the photoelectric conversion device according to the first embodiment in that the count of the pulse signal POUT is stopped when the count value C_OUT exceeds the threshold value, and all the count values C_OUT[1] to C_OUT[n] are maintained at "0". Hereinafter, the present embodiment will be described regarding the configuration different from the first embodiment.

Figure 8:
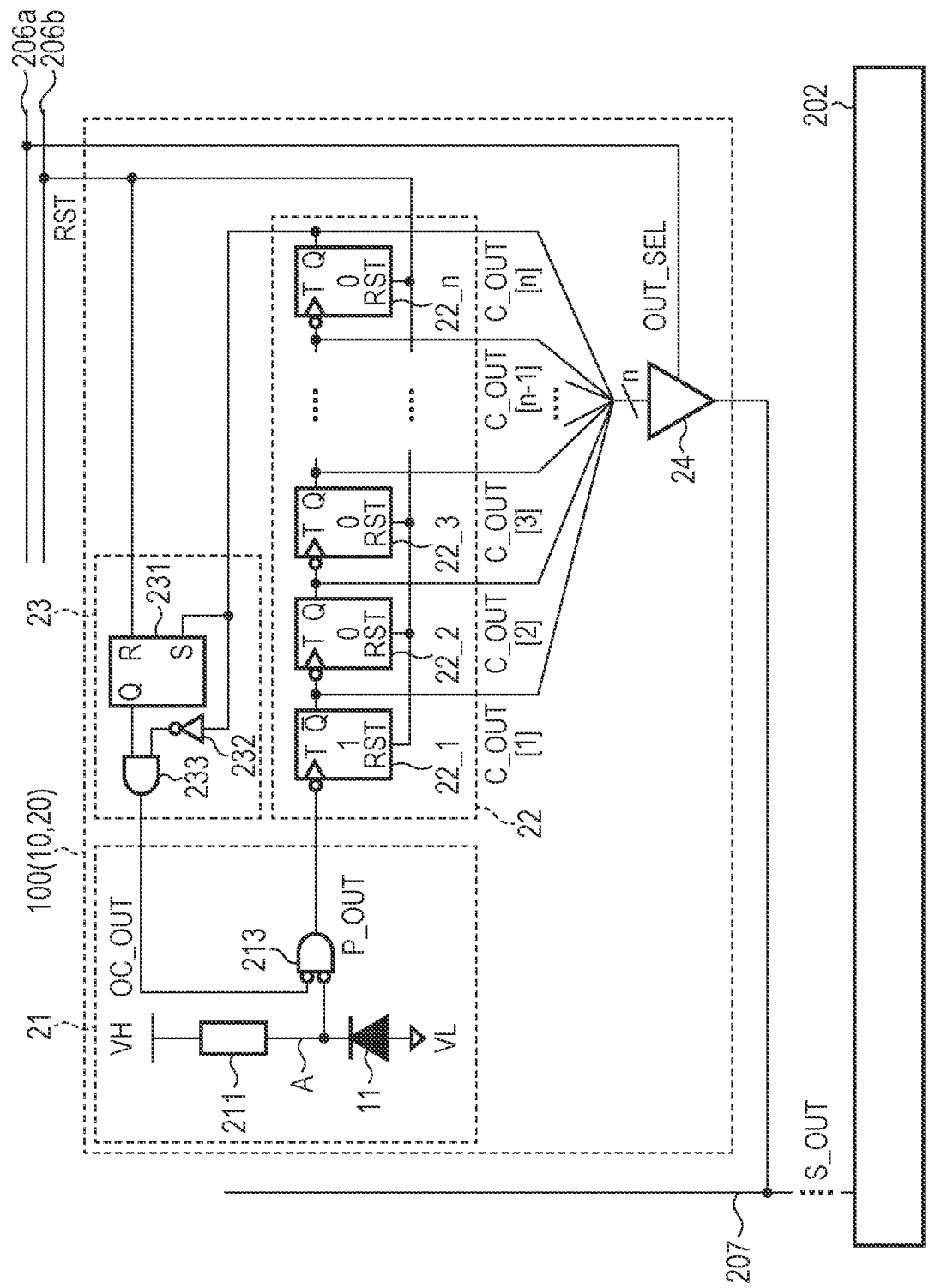
FIG. 8 is a block diagram of a pixel circuit according to a second embodiment.

FIG. 8 is a block diagram of the pixel circuit 100 according to the present embodiment. The pixel circuit 100 includes a photon detection circuit 21, a binary counter 22, a determination circuit 23, and a buffer circuit 24. The photon detection circuit 21 includes an APD 11, a quench element 211, and a waveform shaping circuit 213. The APD 11 and the quench element 211 are configured in the same manner as in the first embodiment. Unlike the first embodiment, the waveform shaping circuit 213 includes a first input node and a second input node. The signal of the cathode of the APD 11 is input to the first input node, and the determination flag OC_OUT is input to the second input node. In the present embodiment, when the determination flag OC_OUT of the determination circuit 23 is at high level, the pulse signal P_OUT is not output from the waveform shaping circuit 213. That is, when the count value C_OUT exceeds the threshold value, the binary counter 22 stops counting the pulse signal P_OUT. Thus, current consumption and noise can be reduced.

The binary counter 22 includes n numbers of T-type flip-flops 22_1 to 22_n, and the binary counter 22 can hold and output n-bit count values C_OUT[I] to C_OUT[n]. Unlike the T-type flip-flops 22_2 to 22_n of the second and subsequent stages, the T-type flip-flop 22_1 of the first stage can output "1" at the time of reset. For example, the inverted output node Q bar of the first stage T-type flip-flop 22_1 may be connected to the input node T of the second stage T-type flip-flop 222. With this configuration, it is possible to distinguish between the value "0 . . . 00" at the time of overflow of the count value C_OUT and the reset value (initial value) "0 . . . 01". The second and subsequent T-type flip-flops 22_2 to 22_n are configured in the same manner as in the first embodiment. A reset signal RST is input from the scanning line 206b to the reset nodes RST of the T-type flip-flops 22_1 to 22_n.

Figure 9:
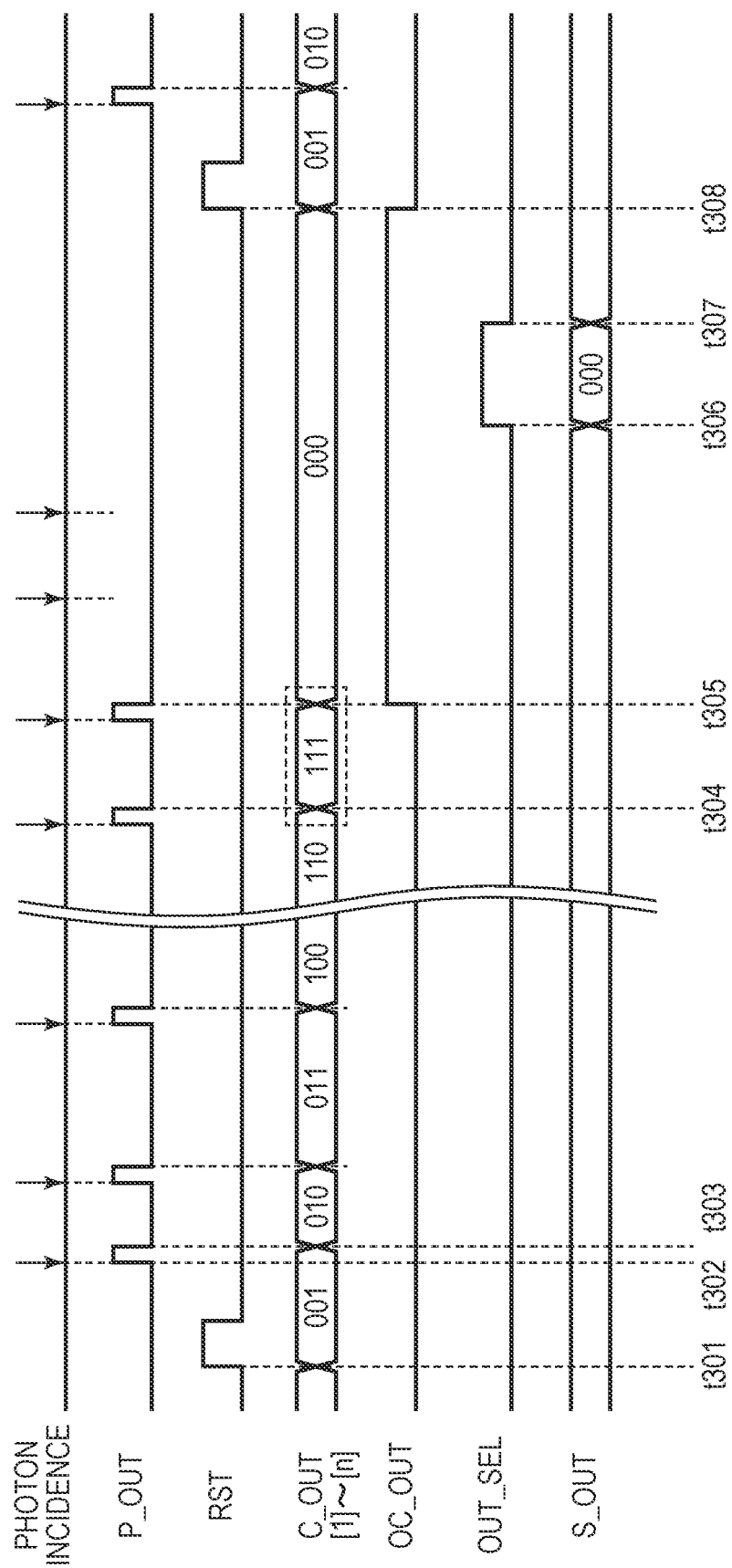
FIG. 9 is a timing chart illustrating the operation of the photoelectric conversion device according to the second embodiment.

FIG. 9 is a timing chart illustrating the operation of the photoelectric conversion device according to the present embodiment when the count value C_OUT exceeds the threshold value "III".

At the time t301, the reset signal RST transits from low level to high level, the count value C_OUT is reset to "001", and the determination flag OC_OUT becomes low level.

When a photon enters the APD 11 at the time t302, the pulse signal P_OUT transits from low level to high level. When the pulse signal P_OUT transits from high level to low level at the time t303, the output node Q bar of the T-type flip-flop 22_1 transits from high level to low level. The count value C_OUT[1] of the LSB transits from "1" to "0", and the count value C_OUT[2] transits from "O" to "1". Thus, the 3-bit count value C_OUT becomes "010". Thereafter, every time a photon enters the APD 11, the count value C_OUT repeatedly counts up, and the count value C_OUT becomes "III" at the time t304.

At the time t305, when the pulse signal POUT transits from high level to low level in response to photon incidence, the 3-bit count value C_OUT transits from "111" to "000". When the count value C_OUT[3] of the MSB transits from "1" to "0", the determination circuit 23 transits the determination flag OC_OUT from low level to high level. Since high level of the determination flag OC_OUT is input to the waveform shaping circuit 213 of the photon detection circuit 21, the waveform shaping circuit 213 stops outputting the pulse signal POUT.

After the time t305, a photon enters the APD 11, but since the determination flag OC_OUT maintains high level, the pulse signal POUT is not output from the waveform shaping circuit 213. Therefore, the count value C_OUT maintains the value of "000" at the time of overflow.

At the time t306 to t307, the control signal OUT_SEL becomes high level. The buffer circuit 24 latches "000" of the count value C_OUT at the present time to output as an output signal S_OUT of three bits. Since the count value C_OUT is "000", the signal processing circuit provided outside or inside the photoelectric conversion device 3 can determine that the count value C_OUT overflows. In this case, the signal processing circuit may correct the count value C_OUT to the maximum value "III".

At the time t308, the reset signal RST transits from low level to high level, and all the T-type flip-flops 22_1 to 22_3 of the binary counter 22 are reset, and the count value C_OUT becomes "001". The RS latch circuit 231 of the determination circuit 23 is also reset, and the determination flag OC_OUT becomes low level.

Figure 10:
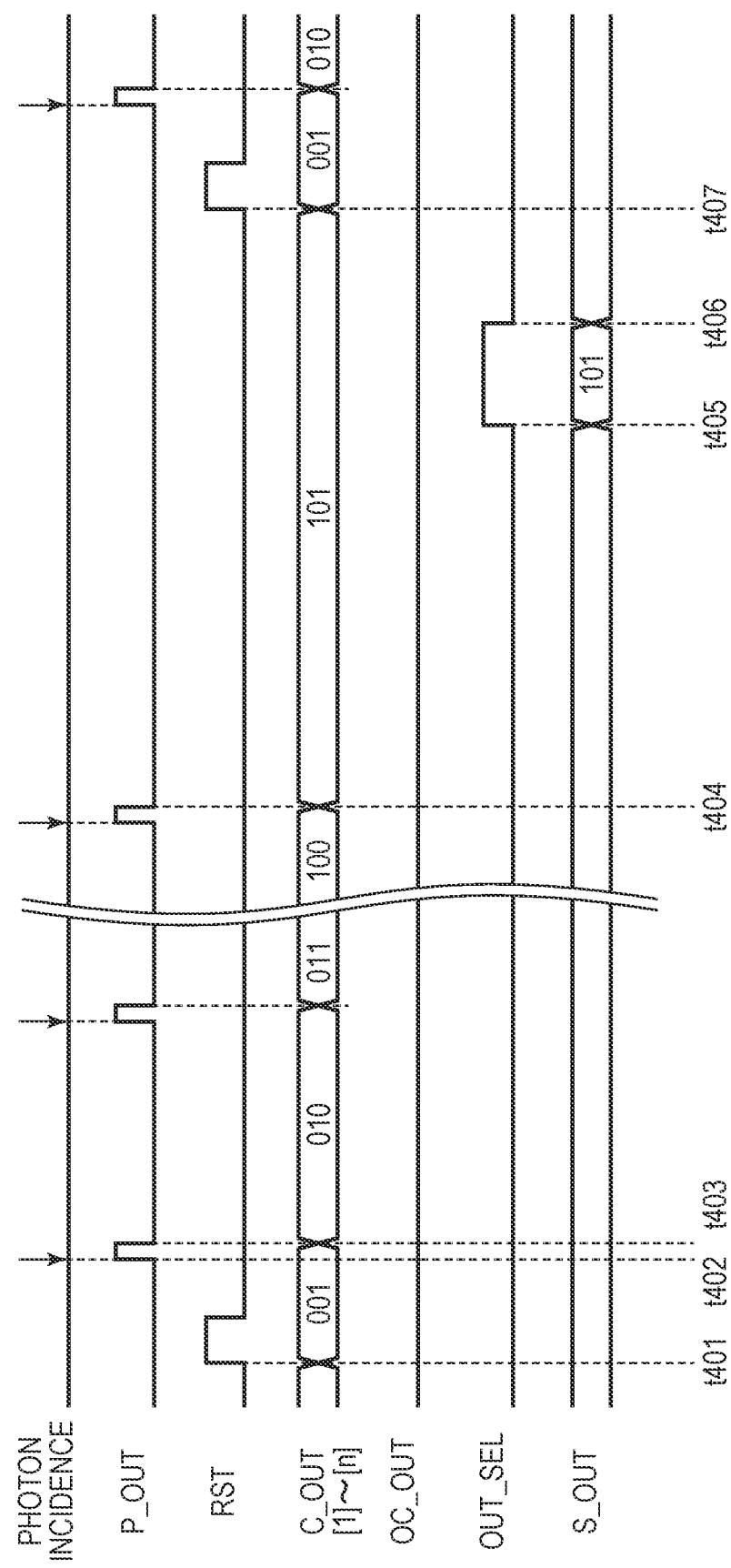
FIG. 10 is a timing chart illustrating the operation of the photoelectric conversion device according to the second embodiment.

FIG. 10 is a timing chart illustrating the operation of the photoelectric conversion device according to the present embodiment, and shows the operation when the count value C_OUT does not exceed the threshold value "111".

At the time t401, the reset signal RST transits from low level to high level. The count value C_OUT is reset to "001", and the determination flag OC_OUT becomes low level.

When a photon enters the APD 11 at the time t402, the pulse signal P_OUT transits from low level to high level. When the pulse signal P_OUT transits from high level to low level at the time t403, the count value C_OUT[1] of the LSB transits from "1" to "0", and the count value C_OUT[2] transits from "0" to "1". Thus, the 3-bit count value C_OUT becomes "010". Thereafter, every time a photon enters the APD 11, the count value C_OUT repeatedly counts up, and the count value C_OUT becomes "101" at the time t404.

At the time t405 to t406, the control signal OUT_SEL becomes high level, and the buffer circuit 24 latches the current count value C_OUT "101" and outputs the latched count value as the 3-bit output signal S_OUT. Since the count value C_OUT is not "000", the signal processing circuit provided outside or inside the photoelectric conversion device 3 determines that the count value C_OUT does not overflow, and "101" of the count value C_OUT is valid. Alternatively, the signal processing circuit may subtract "1" from the count value C_OUT to obtain "100" as the count value C_OUT after correction. Thus, the offset corresponding to the reset value "001" of the count value C_OUT can be corrected.

At the time t407, the reset signal RST transits from low level to high level, all the T-type flip-flops 22_1 to 22_3 of the binary counter 22 are reset, and the count value C_OUT becomes "001". The RS latch circuit 231 of the determination circuit 23 is also reset, and the determination flag OC_OUT maintains low level.

As described above, the photoelectric conversion device according to the present embodiment can determine that the count value C_OUT exceeds the threshold value based on the transition of any one bit of the binary counter 22. Since it is not necessary to detect all bits of the binary counter 22, the circuit scale can be reduced. In particular, by detecting the transition of the MSB of the binary counter 22 from "1" to "0", it is possible to determine that the count value C_OUT overflows while suppressing the circuit scale.

When the count value C_OUT exceeds the threshold value, the photoelectric conversion device in the embodiment stops counting the pulse signal POUT and maintains the count value C_OUT at "00 . . . 0". Therefore, the signal processing circuit determines whether or not the count value C_OUT is "00 . . . 00", thereby recognizing that the count value C_OUT exceeds the threshold value. Further, since the determination result is assigned to a specific value of the count value C_OUT, the determination result can be output without increasing the number of signal lines. Thus, the circuit scale can be further reduced.

Further, according to the present embodiment, when the count value C_OUT exceeds the threshold value, the binary counter 22 stops the counting operation, so that the consumption current and noise can be reduced.

Third Embodiment

Figure 11:
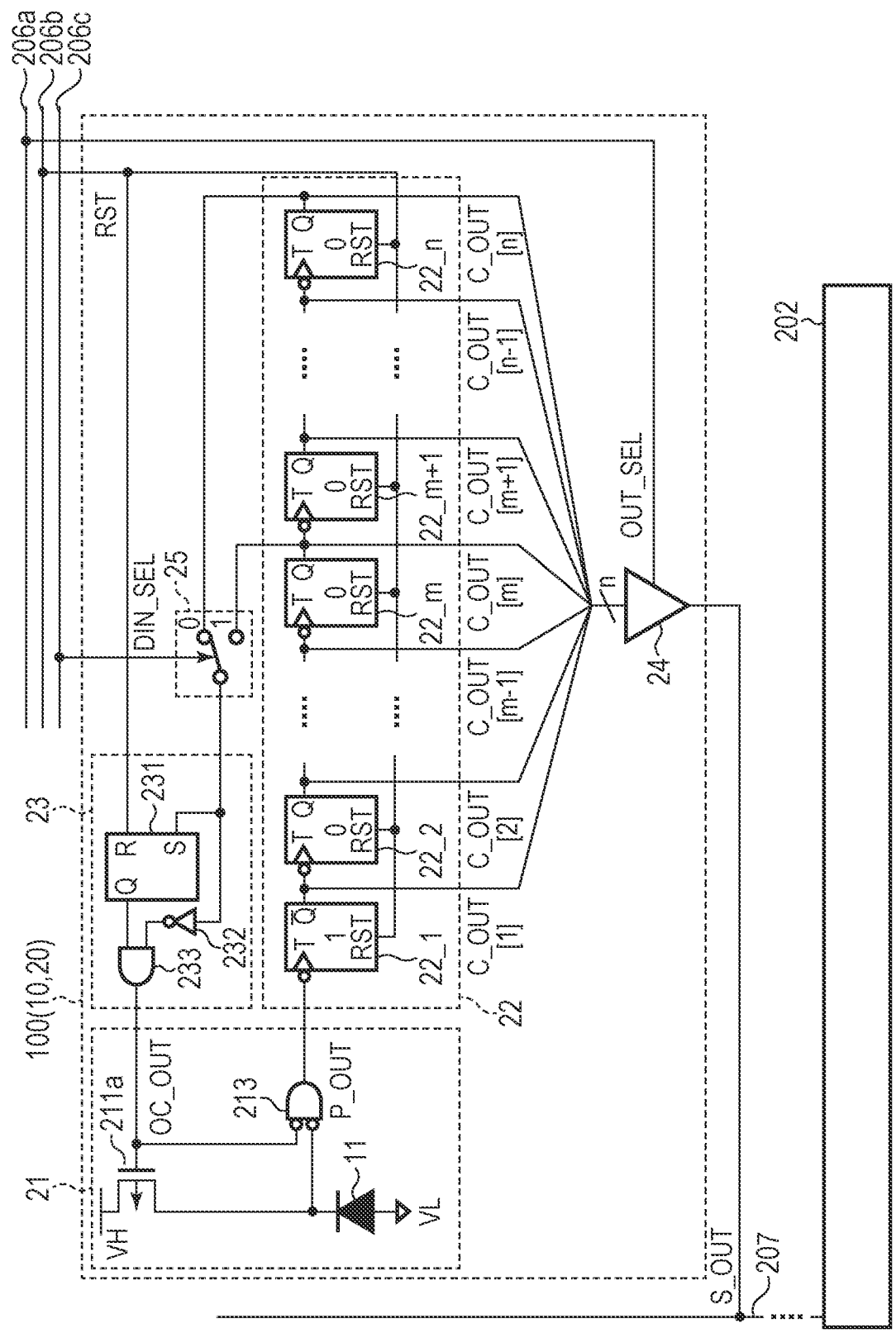
FIG. 11 is a block diagram of a pixel circuit according to a third embodiment.

Next, the photoelectric conversion device according to the present embodiment will be described. FIG. 11 is a block diagram of the pixel circuit 100 according to the present embodiment. The pixel circuit 100 includes a photon detection circuit 21, a binary counter 22, a determination circuit 23, a buffer circuit 24, and a switching circuit 25. Hereinafter, the present embodiment will be described regarding the configuration different from the second embodiment.

The photon detection circuit 21 according to the present embodiment includes the APD 11, the waveform shaping circuit 213, and a PMOS transistor 211a as a quench element. The PMOS transistor 211a is connected to the power supply line supplying the voltage VH and the cathode of the APD 11. That is, the first main node of the PMOS transistor 211a is connected to the power supply line for supplying the voltage VH, and the second main node is connected to the cathode of the APD 11. The determination flag OC_OUT is input from the determination circuit 23 to the gate node of the PMOS transistor 211a. When the determination flag OC_OUT is at low level, the PMOS transistor 211a is turned on, and a current is supplied to the APD 11. When the determination flag OC_OUT is at high level, the PMOS transistor 211a is turned off, and the avalanche multiplication in the APD 11 does not occur. This makes it possible to further reduce current consumption and noise as compared with the second embodiment.

The switching circuit 25 is provided in a signal path between the binary counter 22 and the determination circuit 23, and the switching circuit 25 includes a switch for switching one bit determined by the binary counter 22. The switching circuit 25 can selectively output either the output node Q of the T-type flip-flop 22_n of the MSB or the output node Q of the T-type flip-flop 22_m of the m-th stage to the determination circuit 23. Here, "m" may be any natural number satisfying 1<m<n. The control signal DIN_SEL is supplied from the scanning line 206c, and when the control signal DIN_SEL is at low level, the output node Q of the T-type flip-flop 22_n of the MSB is selected. When the control signal DIN_SEL is at high level, the output node Q of the m-th stage T-type flip-flop 22_m is selected. The switching circuit 25 may be configured to select three or more output nodes Q of the T-type flip-flops 221 to 22_n.

Next, the operation of the photoelectric conversion device according to the present embodiment will be described with reference to FIG. 12 to FIG. 15. FIG. 12 to FIG. 15 show temporal changes of photon incidence, the pulse signal POUT, the reset signal RST, the lower count values C_OUT [1] to C_OUT[m], the upper count values C_OUT[m+1] to C_OUT[n], the determination flag OC_OUT, the control signal OUT_SEL, and the output signal S_OUT. Here, it is assumed that "m" is three (m=3) and "n" is five (n=5), and the lower count values C_OUT[1] to C_OUT[3] and the upper count values C_OUT[4] to C_OUT[5] will be described as an example.

Figure 12:
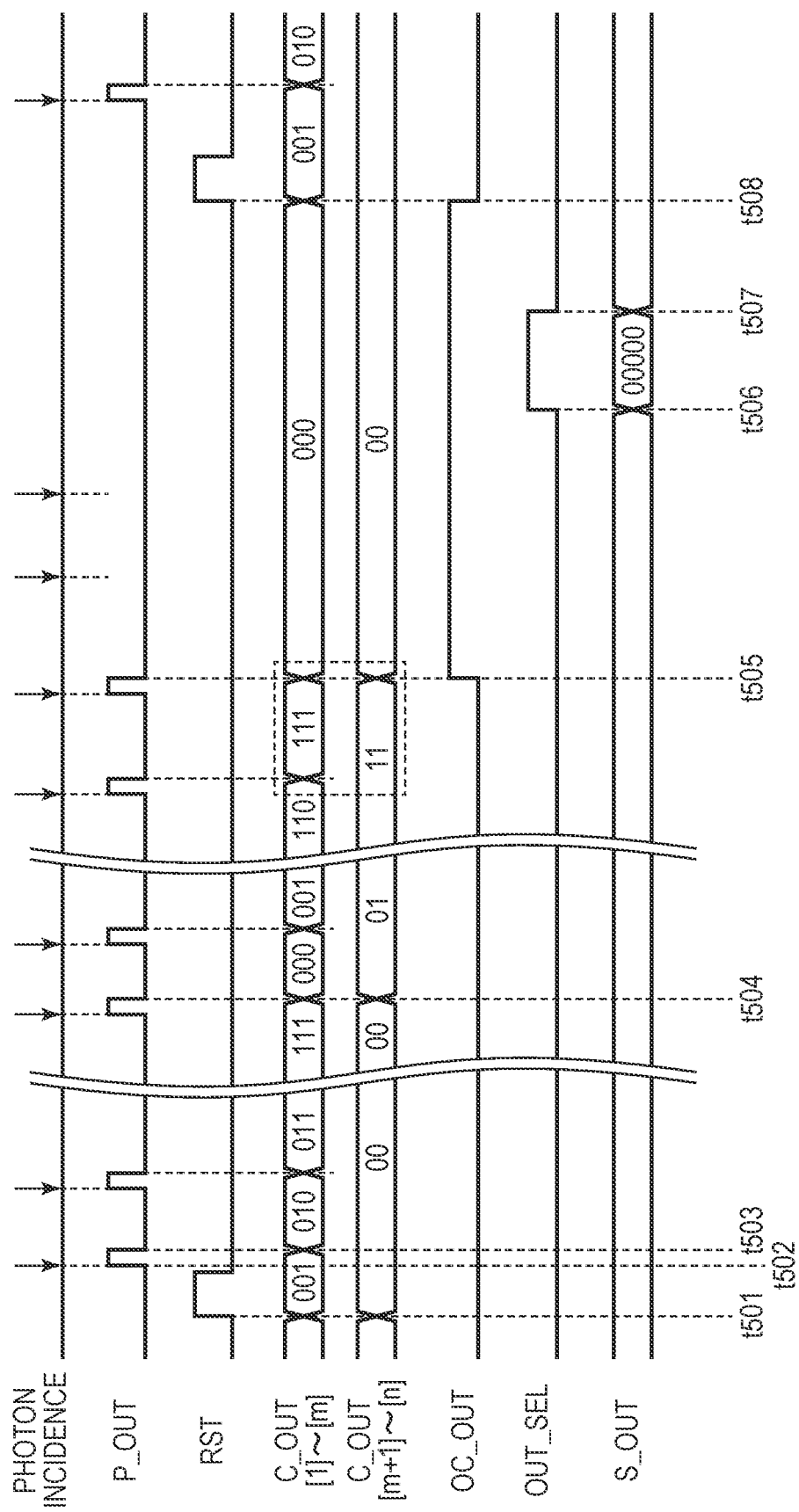
FIG. 12 is a timing chart illustrating the operation of the photoelectric conversion device according to the third embodiment.

FIG. 12 is a timing chart illustrating the operation of the photoelectric conversion device according to the present embodiment when the count value C_OUT exceeds the threshold value "11111". It is assumed that the control signal DIN_SEL is at low level and the switching circuit 25 selects the output node Q of the T-type flip-flop 22_n of the MSB.

At the time t501, the reset signal RST transits from low level to high level, the lower count values C_OUT [1] to C_OUT[3] are reset to "001", and the upper count values C_OUT [4] to C_OUT[5] are reset to "00". The determination flag OC_OUT becomes low level.

When a photon enters the APD 11 at the time t502, the pulse signal P_OUT transits from low level to high level. When the pulse signal P_OUT transits from high level to low level at the time t503, the output node Q bar of the T-type flip-flop 221 transits from high level to low level. The count value C_OUT[1] of the LSB transits from "1" to "0", and the count value C_OUT[2] transits from "0" to "1". Accordingly, the count values C_OUT[1] to C_OUT[3] become "010".

At the time t504, when the pulse signal POUT transits from high level to low level in response to photon incidence, the count values C_OUT[1] to C_OUT[3]transit from "111" to "000", and the count values C_OUT[4] to C_OUT[5] transit from "00" to "01". Thereafter, every time a photon enters the APD 11, the count value C_OUT repeatedly counts up. At the time t505, when the pulse signal P_OUT transits from high level to low level in response to photon incidence, the count values C_OUT[1] to C_OUT[3] transit from "111" to "000", and the count values C_OUT[4] to C_OUT[5]transit from "11" to "00". The determination circuit 23 detects that the count value C_OUT[5] of the MSB has transited from "1" to "0", and the determination circuit 23 changes the determination flag OC_OUT from low level to high level. Since the determination flag OC_OUT of high level is input to the waveform shaping circuit 213 of the photon detection circuit 21, the waveform shaping circuit 213 stops outputting the pulse signal POUT. Further, the PMOS transistor 211a is turned off, and the avalanche multiplication in the APD 11 does not occur.

After the time t505, a photon enters the APD 11, but since the determination flag OC_OUT maintains high level, the pulse signal P_OUT is not output from the photon detection circuit 21. Therefore, the binary counter 22 stops counting, and the count values C_OUT[1] to C_OUT[5] maintain the value "00000" at the time of overflow.

From the time t506 to t507, the control signal OUT_SEL becomes high level. The buffer circuit 24 latches the current count values C_OUT[1] to C_OUT[5], and outputs "00000" as the output signal S_OUT. Since the output signal S_OUT is "00000", the signal processing circuit provided outside or inside the photoelectric conversion device 3 can determine that the count values C_OUT[1] to C_OUT[5] of 5 bits overflow and invalidate the output signal S_OUT. In this case, the signal processing circuit may correct the count value C_OUT to the maximum value "11111".

At the time t508, the reset signal RST transits from low level to high level, all the T-type flip-flops 22_1 to 22_5 of binary counter 22 are reset, and count values C_OUT[1] to C_OUT[5] become "00001". The RS latch circuit 231 of the determination circuit 23 is also reset, and the determination flag OC_OUT becomes low level.

Figure 13:
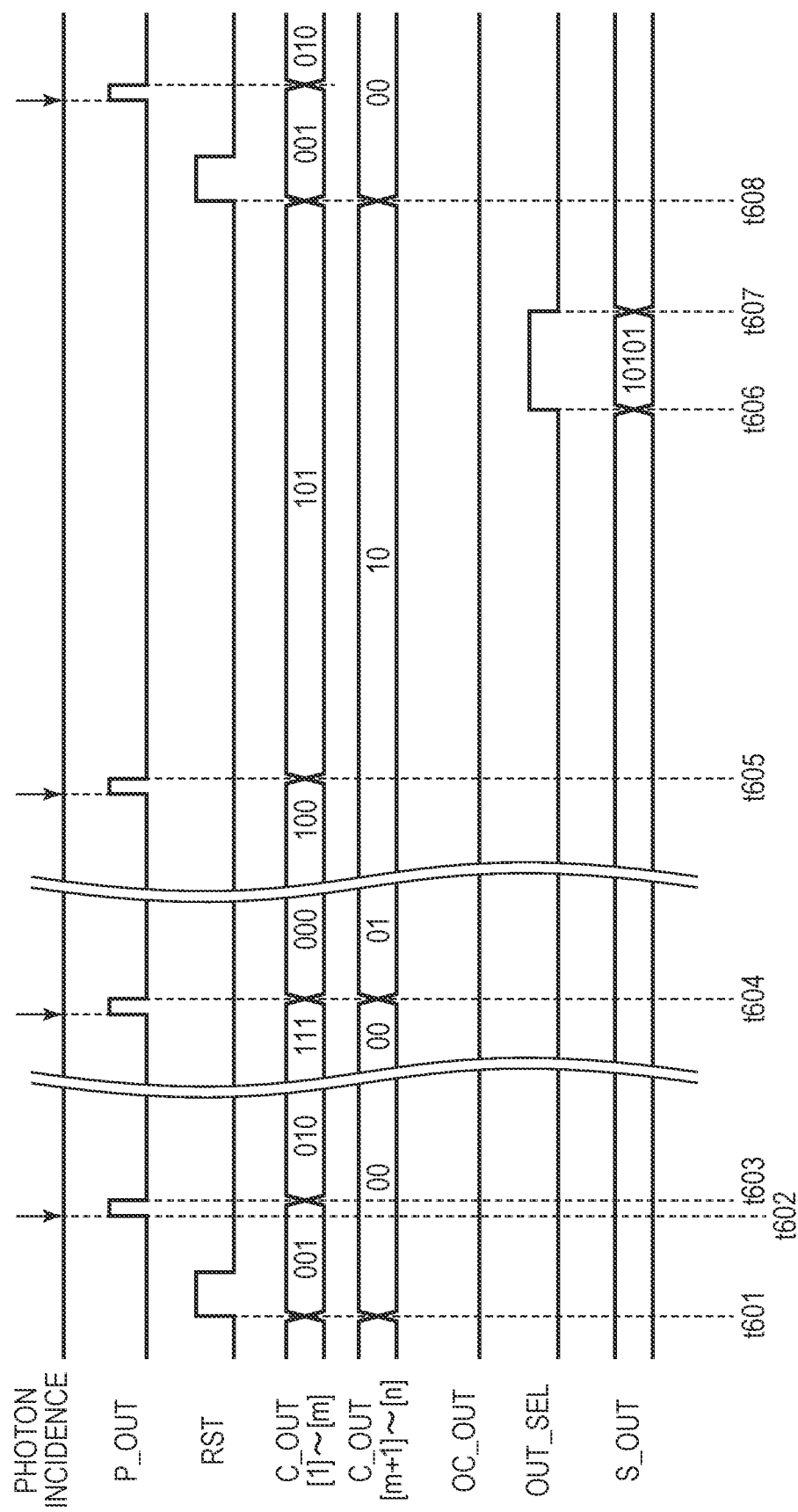
FIG. 13 is a timing chart illustrating the operation of the photoelectric conversion device according to the third embodiment.

FIG. 13 is a timing chart illustrating the operation of the photoelectric conversion device according to the present embodiment, and shows the operation when the count value C_OUT does not exceed the threshold value "11111". It is assumed that the control signal DIN_SEL is at low level and the switching circuit 25 selects the output node Q of the T-type flip-flop 22_n of the MSB.

At the time t601, the reset signal RST transits from low level to high level, the lower count values C_OUT[1] to C_OUT[3] are reset to "001", and the upper count values C_OUT [4] to C_OUT[5] are reset to "00". The determination flag OC_OUT becomes low level.

When a photon enters the APD 11 at the time t602, the pulse signal P_OUT transitions from low level to high level. When the pulse signal P_OUT transits from high level to low level at the time t603, the output node Q bar of the T-type flip-flop 22_1 transits from high level to low level. The count value C_OUT[1] of the LSB transits from "1" to "0", and the count value C_OUT[2] transits from "0" to "1". Accordingly, the count values C_OUT[1] to C_OUT[3] become "010". Thereafter, every time a photon enters the APD 11, the count value C_OUT repeatedly counts up. At the time t604, the count values C_OUT[1] to C_OUT[3] transit from "111" to "000", and the count values C_OUT[4] to C_OUT[5] transit from "00" to "01". At the time t605, when the pulse signal P_OUT transits from high level to low level in response to photon incidence, the count values C_OUT[II] to C_OUT[3] transit from "100" to "101", and the count values C_OUT[4] to C_OUT[5] maintain "10".

From the time t606 to t607, the control signal OUT_SEL becomes high level. The buffer circuit 24 latches the current count values C_OUT[1] to C_OUT[5], and outputs "10101" as the output signal S_OUT. Since the output signal S_OUT is not "00000", the signal processing circuit provided outside or inside the photoelectric conversion device 3 determines that the count values C_OUT[1] to C_OUT[5] do not overflow, and can validate the output signal S_OUT. Alternatively, the signal processing circuit may subtract "1" from the count value C_OUT to obtain "10100" as the count value C_OUT after correction. Thus, the offset of the reset value "00001" can be corrected.

At the time t608, the reset signal RST transits from low level to high level, all the T-type flip-flops 22_1 to 22_5 of binary counter 22 are reset, and the count values C_OUT[1] to C_OUT[5] become "00001". The RS latch circuit 231 of the determination circuit 23 is also reset, and the determination flag OC_OUT maintains low level.

Figure 14:
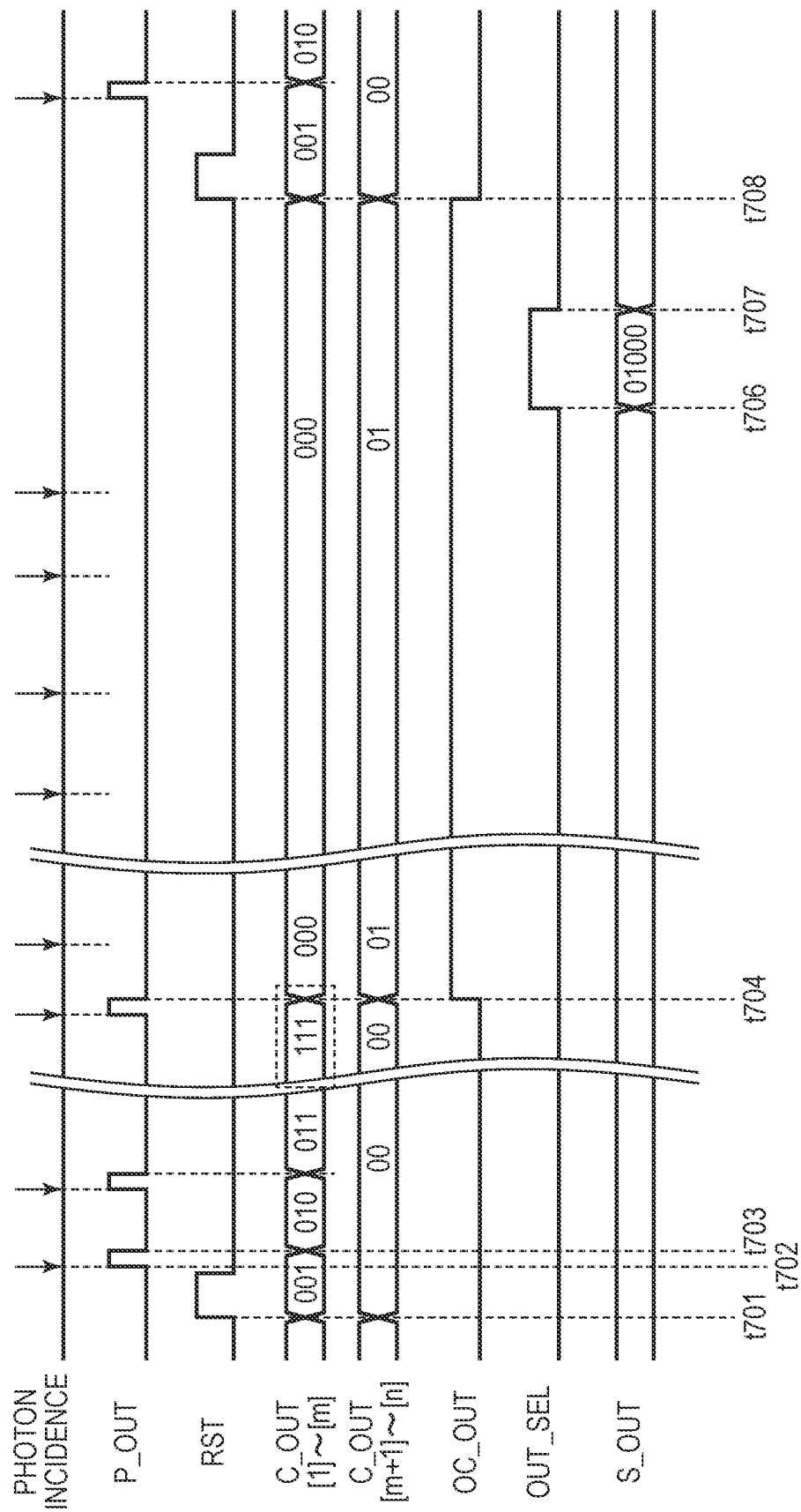
FIG. 14 is a timing chart illustrating the operation of the photoelectric conversion device according to the third embodiment.

FIG. 14 is a timing chart illustrating the operation of the photoelectric conversion device according to the present embodiment when the count value C_OUT exceeds the threshold value "00111". It is assumed that the control signal DIN_SEL is at high level and the switching circuit 25 selects the output node Q of the third stage T-type flip-flop 223.

At the time t701, the reset signal RST transits from low level to high level, the lower count values C_OUT[1] to C_OUT[3] are reset to "001", and the upper count values C_OUT[4] to C_OUT[5] are reset to "00". The determination flag OC_OUT becomes low level.

When a photon enters the APD 11 at the time t702, the pulse signal P_OUT transits from low level to high level. When the pulse signal P_OUT transits from high level to low level at the time t703, the output node Q bar of the T-type flip-flop 22_1 transits from high level to low level. The count value C_OUT[1] of the LSB transits from "1" to "0", and the count value C_OUT[2] transits from "O" to "1". Accordingly, the count values C_OUT[1] to C_OUT[3] become "010". Thereafter, every time a photon enters the APD 11, the count value C_OUT repeatedly counts up.

At the time t704, when the pulse signal POUT transits from high level to low level in response to photon incidence, the count values C_OUT[1] to C_OUT[3]transit from "111" to "000", and the count values C_OUT[4] to C_OUT[5] transit from "00" to "01". The determination circuit 23 detects that the count value C_OUT[3] has transited from "1" to "0", and the determination circuit 23 changes the determination flag OC_OUT from low level to high level. Since the determination flag OC_OUT of high level is input to the waveform shaping circuit 213 of the photon detection circuit 21, the waveform shaping circuit 213 stops outputting the pulse signal POUT. Further, the PMOS transistor 211a is turned off, and the avalanche multiplication in the APD 11 does not occur.

After the time t704, a photon enters the APD 11, but since the determination flag OC_OUT maintains high level, the pulse signal POUT is not output from the waveform shaping circuit 213. Therefore, the count values C_OUT[1] to C_OUT[5] maintain "01000".

From the time t706 to t707, the control signal OUT_SEL becomes high level. The buffer circuit 24 latches the current count values C_OUT[1] to C_OUT[5], and outputs "01000" as the output signal S_OUT. The signal processing circuit provided outside or inside the photoelectric conversion device 3 can determine that the count values C_OUT[1] to C_OUT[5] exceed the threshold value "0011" based on "01000" of the output signal S_OUT, and the signal processing circuit can execute predetermined signal processing.

At the time t708, the reset signal RST transits from low level to high level, all the T-type flip-flops 22_1 to 22_5 of binary counter 22 are reset, and the count values C_OUT[1] to C_OUT[5] become "00001". The RS latch circuit 231 of the determination circuit 23 is also reset, and the determination flag OC_OUT becomes low level.

Figure 15:
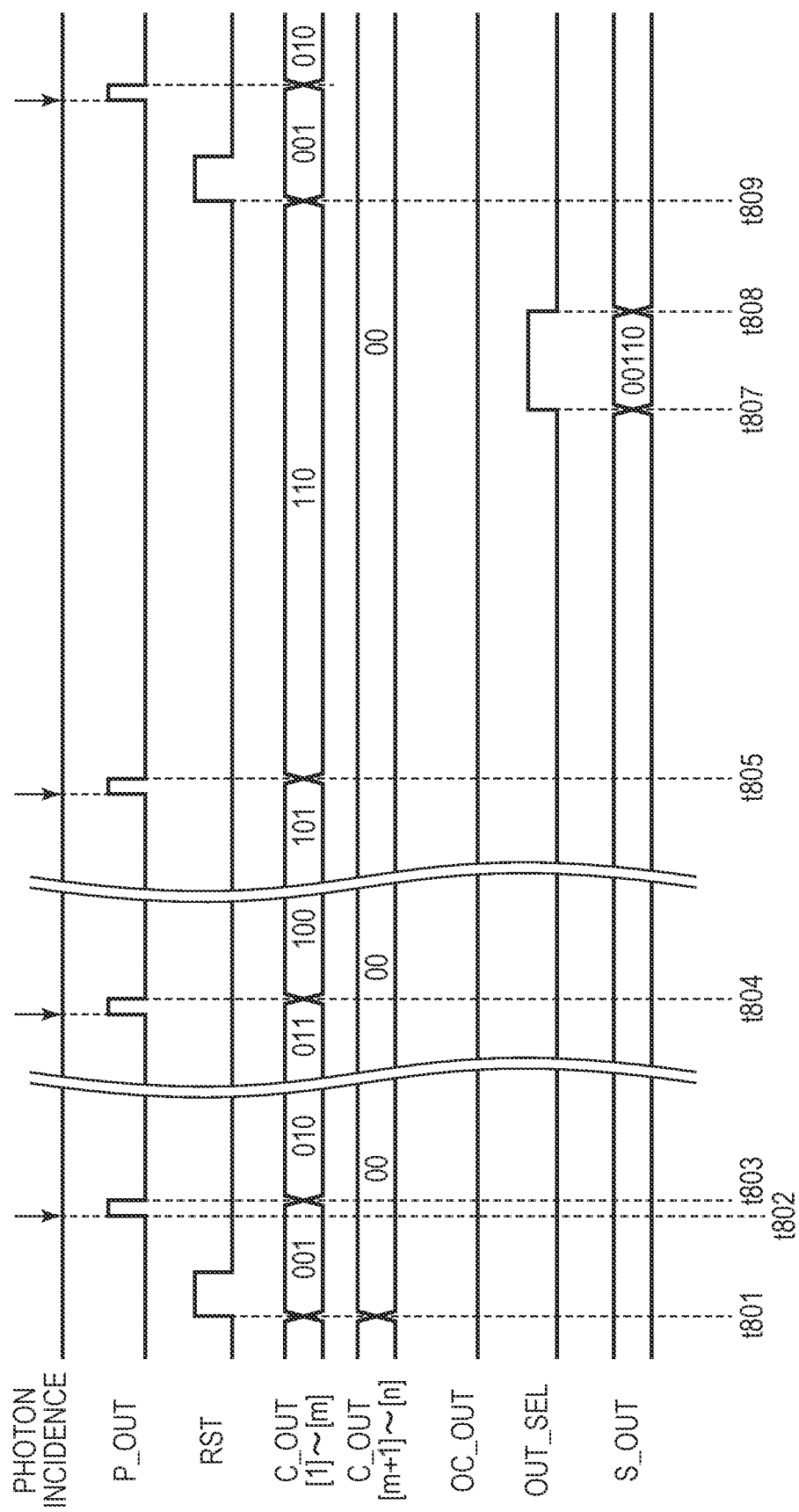
FIG. 15 is a timing chart illustrating the operation of the photoelectric conversion device according to the third embodiment.

FIG. 15 is a timing chart illustrating the operation of the photoelectric conversion device according to the present embodiment, and shows the operation when the count value C_OUT does not exceed the threshold value "00111". It is assumed that the control signal DIN_SEL is at high level and the switching circuit 25 selects the output node Q of the third stage T-type flip-flop 223.

At the time t801, the reset signal RST transits from low level to high level, the lower count values C_OUT[1] to C_OUT[3] are reset to "001", and the upper count values C_OUT[4] to C_OUT[5] are reset to "00". The determination flag OC_OUT becomes low level.

When a photon enters the APD 11 at the time t802, the pulse signal P_OUT transits from low level to high level. When the pulse signal P_OUT transits from high level to low level at the time t803, the output node Q bar of the T-type flip-flop 22_1 transits from high level to low level. The count value C_OUT[1] of the LSB transits from "1" to "0", and the count value C_OUT[2] transits from "O" to "1". Accordingly, the count values C_OUT[1] to C_OUT[3] become "010". Thereafter, every time a photon enters the APD 11, the count value C_OUT repeats counting up, and the count values C_OUT[1] to C_OUT[3] transit from "011" to "100" at the time t804. At the time t805, when the pulse signal POUT transits from high level to low level in response to photon incidence, the count values C_OUT[1] to C_OUT[3] transit from "101" to "110", and the count values C_OUT[4] to C_OUT[5] maintain "00".

From the time t807 to t808, the control signal OUT_SEL becomes high level. The buffer circuit 24 latches the current count values C_OUT[1] to C_OUT[5], and outputs "00110" as the output signal S_OUT. Since the output signal S_OUT is not "01000", the signal processing circuit provided outside or inside the photoelectric conversion device 3 can determine that the count values C_OUT[1] to C_OUT[5] do not exceed the threshold.

At the time t809, the reset signal RST transits from low level to high level, all the T-type flip-flops 22_1 to 22_5 of binary counter 22 are reset, and the count values C_OUT[1] to C_OUT[5] become "00001". The RS latch circuit 231 of the determination circuit 23 is also reset, and the determination flag OC_OUT maintains low level.

As described above, the photoelectric conversion device according to the present embodiment determines that the count value C_OUT exceeds the threshold value based on any one bit of the binary counter 22. Therefore, since it is not necessary to detect all bits of the binary counter 22, the circuit scale can be reduced. The photoelectric conversion device according to the present embodiment further includes a switching circuit for switching one bit determined by the determination circuit. Thus, the threshold value can be appropriately changed in accordance with the signal processing.

Further, according to the present embodiment, when the count value C_OUT exceeds the threshold value, not only the pulse signal P_OUT is output, but also the current is not supplied to the APD 11. This makes it possible to further reduce current consumption and noise as compared with the second embodiment.

The operations of the photon detection circuit 21 and the binary counter 22 may be appropriately changed in accordance with the threshold. For example, when the threshold value is set to a value smaller than the MSB of the binary counter 22 (FIG. 14 and FIG. 15), even after the count value C_OUT exceeds the threshold value, the photon detection circuit 21 may continue to output the pulse signal POUT, and the binary counter 22 may continue to count the pulse signal P_OUT. In this case, as in the first embodiment, the determination result by the determination circuit 23 may be added to the count value C_OUT as an additional one bit.

Fourth Embodiment

Figure 16:
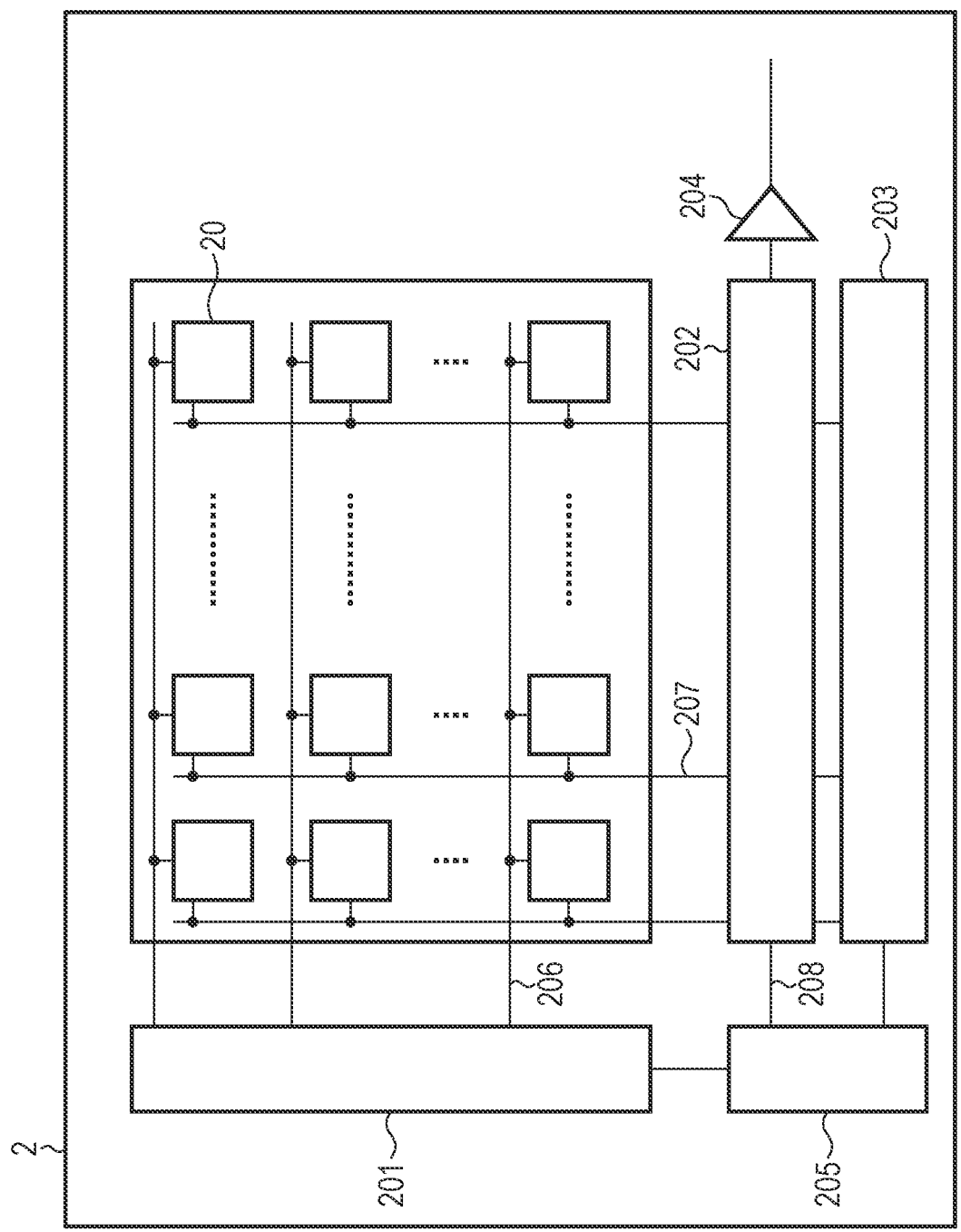
FIG. 16 illustrates an example of an arrangement of circuit board according to a fourth embodiment.

FIG. 16 is an example of an arrangement example of the circuit board 2 according to the present embodiment, and shows a modified example of the arrangement of the circuit board 2 in FIG. 3. In the circuit board 2 of FIG. 3, the readout circuit 202 reads a signal from the signal line 207 connected to the pixels 10 in each row, whereas in the circuit board 2 of FIG. 16, the readout circuit 202 reads a signal from the signal line 207 connected to the pixels 10 in each column. Thus, the circuit board 2 may be configured by various arrangements. Also in the present embodiment, the same operation and effect as those of the above embodiments can be achieved.

Fifth Embodiment

Figure 17:
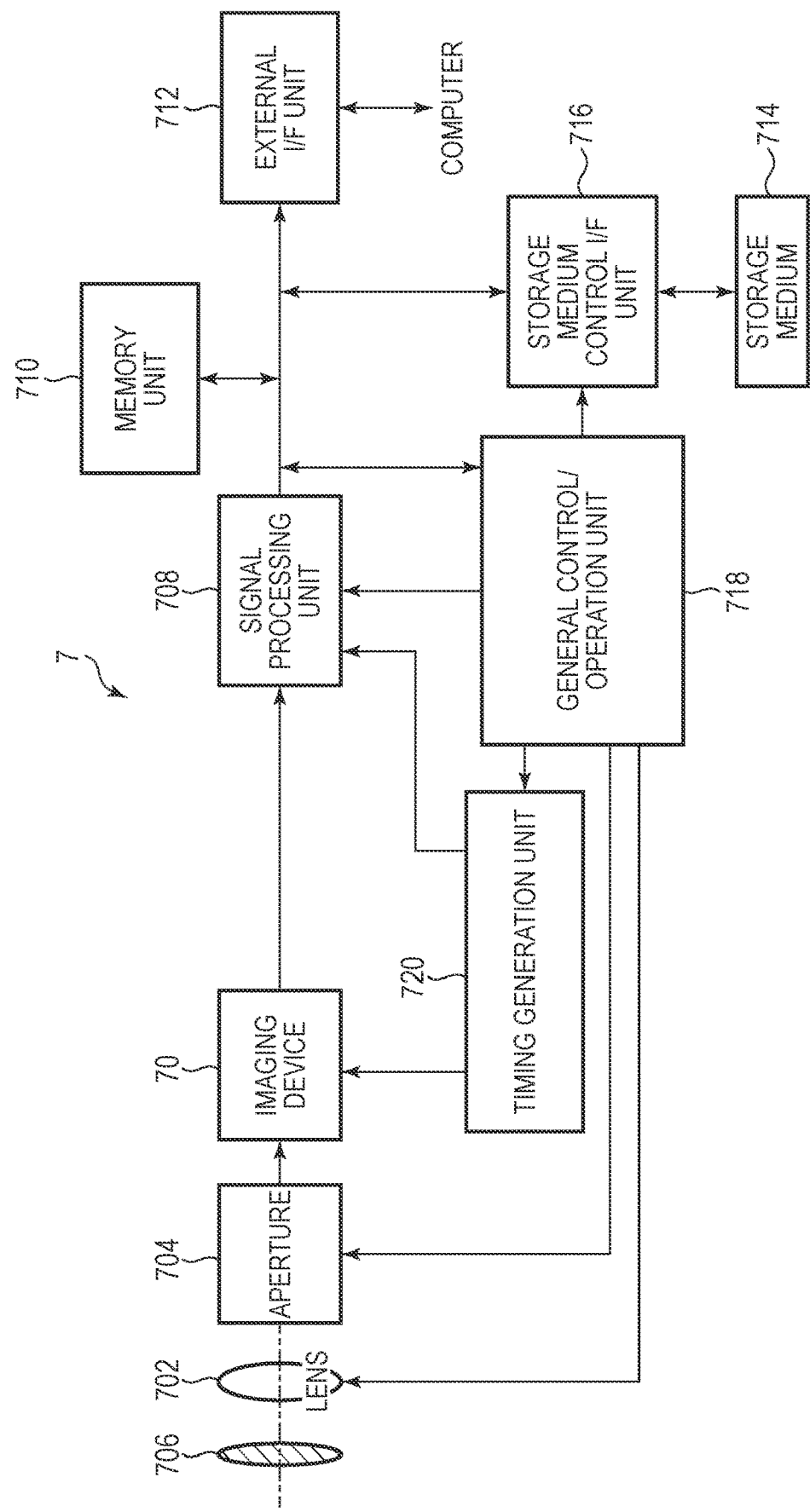
FIG. 17 is a block diagram of a photodetection system according to a fifth embodiment.

An imaging system according to a fifth embodiment of the disclosure will be described with reference to FIG. 17. FIG. 17 is a block diagram of an imaging system according to the present embodiment.

The photoelectric conversion apparatus in the above-described embodiments can be applied to various imaging systems. Examples of the imaging system include a digital still camera, a digital camcorder, a camera head, a copier, a fax machine, a cellular phone, an in-vehicle camera, an observation satellite, and a surveillance camera. FIG. 17 is a block diagram of a digital still camera as an example of an imaging system.

The imaging system 7 includes a barrier 706, a lens 702, an aperture 704, an imaging device 70, a signal processing unit 708, a timing generation unit 720, a general control/operation unit 718, a memory unit 710, a storage medium control I/F unit 716, a storage medium 714, and an external I/F unit 712. The barrier 706 protects the lens, and the lens 702 forms an optical image of the subject on the imaging device 70. The aperture 704 varies the amount of light passing through the lens 702. The imaging device 70 is configured like the photoelectric conversion device of the above embodiments, and converts an optical image formed by the lens 702 into image data. The signal processing unit 708 compresses various corrections and data on the imaging data output from the imaging device 70.

The timing generation unit 720 outputs various timing signals to the imaging device 70 and the signal processing unit 708. The general control/operation unit 718 controls the overall digital still camera, and the memory unit 710 temporarily stores image data. The storage medium control I/F unit 716 is an interface for recording or reading image data in or from the storage medium 714, and the storage medium 714 is a removable storage medium such as a semiconductor memory for recording or reading image data. The external I/F unit 712 is an interface for communicating with an external computer or the like. The timing signal or the like may be input from the outside of the imaging system, and the imaging system may include at least the imaging device 70 and a signal processing unit 708 that processes the image signal output from the imaging device 70.

In the present embodiment, the imaging device 70 and the signal processing unit 708 are provided on different semiconductor substrates, but the imaging device 70 and the signal processing unit 708 may be formed on the same semiconductor substrate.

Each pixel includes a first photoelectric conversion unit and a second photoelectric conversion unit. The signal processing unit 708 may process the pixel signal based on the charge generated in the first photoelectric conversion unit and the pixel signal based on the charge generated in the second photoelectric conversion unit, and acquire the distance information from the imaging device 70 to the subject.

Sixth Embodiment

Figure 18:
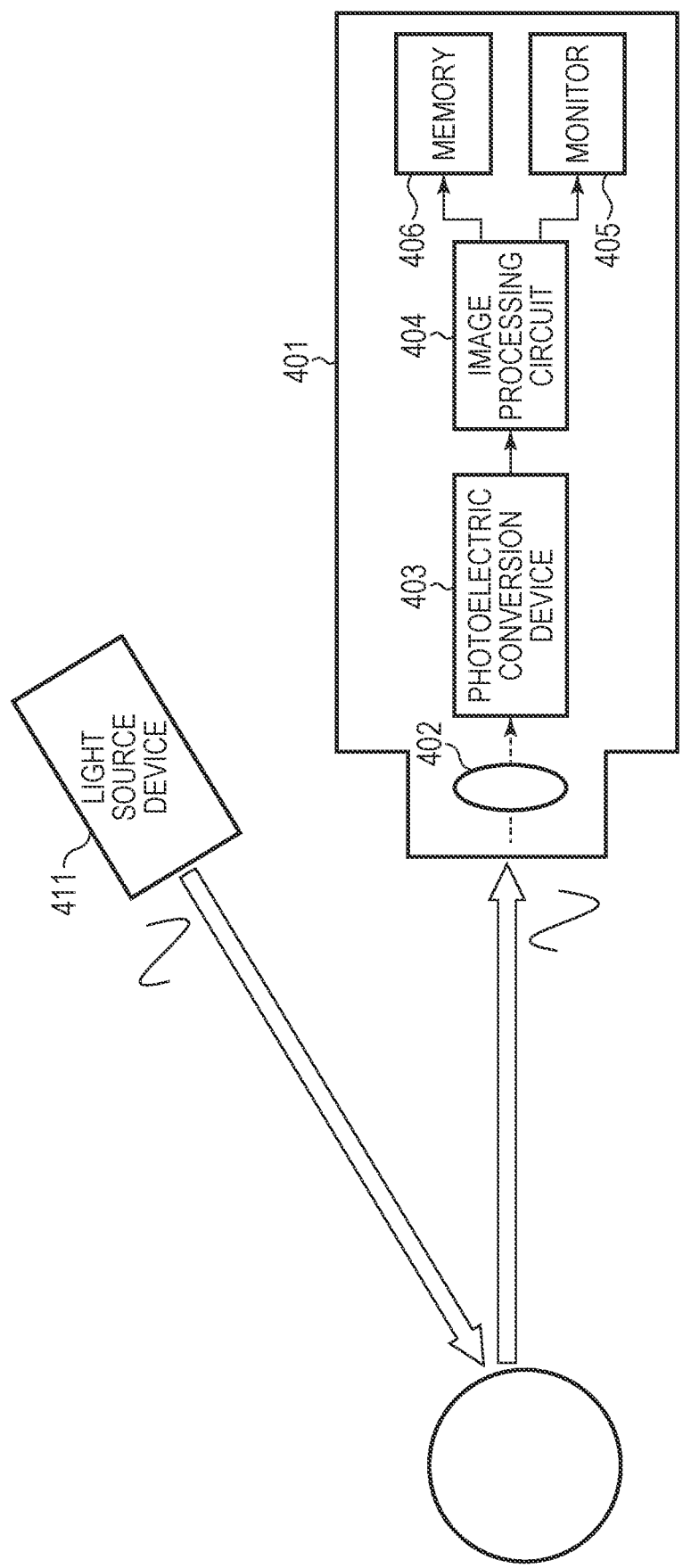
FIG. 18 is a block diagram of a photodetection system according to a sixth embodiment.

FIG. 18 is a block diagram of a photodetection system according to the present embodiment, and a ranging image sensor using the photoelectric conversion device according to the above-described embodiments.

As shown in FIG. 18, the ranging image sensor 401 includes an optical system 402, a photoelectric conversion device 403, an image processing circuit 404, a monitor 405, and a memory 406. The ranging image sensor 401 receives light (modulated light, pulsed light) emitted from the light source device 411 toward the subject and reflected by the surface of the subject. The ranging image sensor 401 can acquire a distance image corresponding to the distance to the subject based on the time from light emission to light reception.

The optical system 402 includes one or a plurality of lenses, guides image light (incident light) from a subject to the photoelectric conversion device 403, and forms an image on a light receiving surface (sensor portion) of the photoelectric conversion device 403.

As the photoelectric conversion device 403, the photoelectric conversion device of each of the above embodiments can be applied. The photoelectric conversion device 403 supplies a distance signal indicating a distance obtained from the received light signal to the image processing circuit 404.

The image processing circuit 404 performs image processing for forming a distance image based on the distance signal supplied from the photoelectric conversion device 403. The distance image (image data) obtained by image processing can be displayed on the monitor 405 and stored (recorded) in the memory 406.

By applying the photoelectric conversion device described above to the ranging image sensor 401 configured as described above, a more accurate distance image can be acquired along with improvement in pixel characteristics.

Seventh Embodiment

The technology according to the present disclosure can be applied to various products. For example, techniques according to the present disclosure may be applied to endoscopic surgical systems.

FIG. 19 is a schematic view of an endoscopic surgical system according to the present embodiment. FIG. 19 shows a state in which an operator (physician) 1131 performs surgery on a patient 1132 on a patient bed 1133 using the endoscope surgery system 1103. As shown, the endoscope surgery system 1103 includes an endoscope 1100, a surgery tool 1110, and a cart 1134 on which various devices for endoscopic surgery are mounted.

The endoscope 1100 includes a lens barrel 1101 in which a region of a predetermined length from the distal end is inserted into the body cavity of the patient 1132, a camera head 1102 connected to the proximal end of the lens barrel 1101, and an arm 1121. Although FIG. 19 shows an endoscope 1100 configured as a so-called rigid mirror having a rigid lens barrel 1101, the endoscope 1100 may be configured as a so-called flexible mirror having a flexible lens barrel.

An opening into which an objective lens is fitted is provided at a distal end of the lens barrel 1101. A light source device 1203 is connected to the endoscope 1100, and light generated by the light source device 1203 is guided to the distal end of the barrel by a light guide extended inside the barrel 1101, and is irradiated toward an observation target in the body cavity of the patient 1132 via an objective lens. The endoscope 1100 may be a direct-view mirror, a perspective mirror, or a side-view mirror.

An optical system and a photoelectric conversion device are provided inside the camera head 1102, and reflected light (observation light) from an observation target is focused on the photoelectric conversion device by the optical system. The observation light is photoelectrically converted by the photoelectric conversion device, and an electric signal corresponding to the observation light, that is, an image signal corresponding to the observation image is generated. As the photoelectric conversion device, the photoelectric conversion device described in each of the above embodiments can be used. The image signal is transmitted to a camera control unit (CCU) 1135 as raw data.

The CCU 1135 includes a central processing unit (CPU), a graphics processing unit (GPU), and the like, and controls overall operations of the endoscope 1100 and the display device 1136. Further, the CCU 1135 receives an image signal from the camera head 1102, and performs various kinds of image processing for displaying an image based on the image signal, such as development processing (demosaic processing).

The display device 1136 displays an image based on the image signal subjected to the image processing by the CCU 1135 under the control of the CCU 1135.

The light source device 1203 includes, for example, a light source such as an LED (Light Emitting Diode), and supplies irradiation light to the endoscope 1100 when capturing an image of an operating part or the like.

The input device 1137 is an input interface to the endoscope surgical system 1003. The user can input various types of information and input instructions to the endoscope surgical system 1003 via the input device 1137.

The processing tool control device 1138 controls the actuation of the energy treatment tool 1112 for ablation of tissue, incision, sealing of blood vessels, etc.

The light source device 1203 is capable of supplying irradiation light to the endoscope 1100 when capturing an image of the surgical site, and may be, for example, a white light source formed by an LED, a laser light source, or a combination thereof. When a white light source is configured by a combination of RGB laser light sources, the output intensity and output timing of each color (each wavelength) can be controlled with high accuracy. Therefore, the white balance of the captured image can be adjusted in the light source device 1203. In this case, laser light from each of the RGB laser light sources may be irradiated onto the observation target in a time-division manner, and driving of the image pickup device of the camera head 1102 may be controlled in synchronization with the irradiation timing. Thus, images corresponding to R, G, and B can be taken in a time-division manner. According to this method, a color image can be obtained without providing a color filter in the image pickup device.

The driving of the light source device 1203 may be controlled such that the intensity of light output from the light source device 1203 is changed at predetermined time intervals. By controlling the driving of the image pickup device of the camera head 1102 in synchronization with the timing of changing the intensity of light to acquire an image in a time-sharing manner, and by synthesizing the images, it is possible to generate an image in a high dynamic range without so-called black-blurring and white-blurring.

Further, the light source device 1203 may be configured to be able to supply light in a predetermined wavelength band corresponding to special light observation. In special light observation, for example, the wavelength dependence of light absorption in body tissue can be used. Specifically, a predetermined tissue such as a blood vessel in the surface layer of the mucous membrane is imaged with high contrast by irradiating light in a narrow band compared to the irradiation light (i.e., white light) during normal observation. Alternatively, in special light observation, fluorescence observation for obtaining an image by fluorescence generated by irradiation with excitation light may be performed. In the fluorescence observation, excitation light can be irradiated to the body tissue to observe fluorescence from the body tissue, or a reagent such as indocyanine green (ICG) can be locally poured into the body tissue and the body tissue can be irradiated with excitation light corresponding to the fluorescence wavelength of the reagent to obtain a fluorescence image. The light source device 1203 may be configured to be able to supply narrowband light and/or excitation light corresponding to such special light observation.

Eighth Embodiment

The photodetection system and the movable body of the present embodiment will be described with reference to FIGS. 20A, 20B, 20C, 20D, and 21. In the present embodiment, an example of an in-vehicle camera is shown as a photodetection system.

Figure 20A:
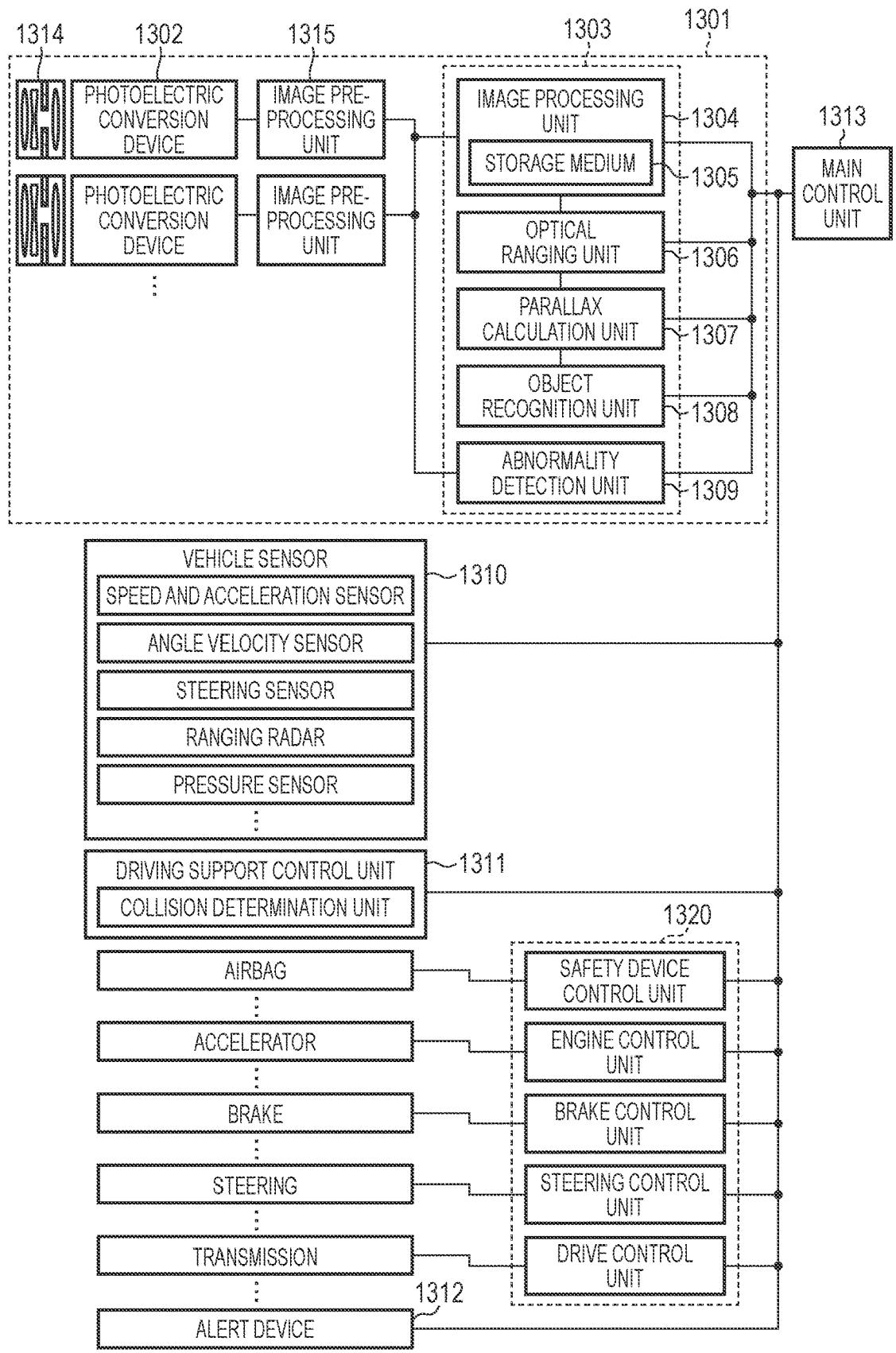
FIG. 20A is a schematic diagram of a photodetection system according to an eighth embodiment.
Figure 20B:
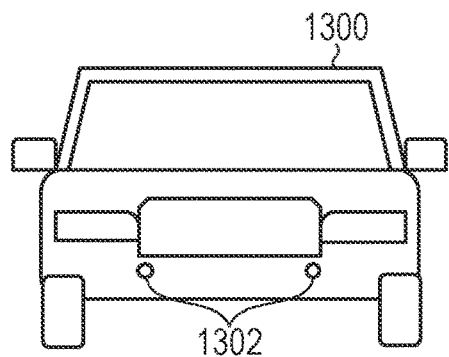
FIGS. 20B, 20C, and 20D are schematic diagrams of a movable object according to the eighth embodiment.
Figure 20C:
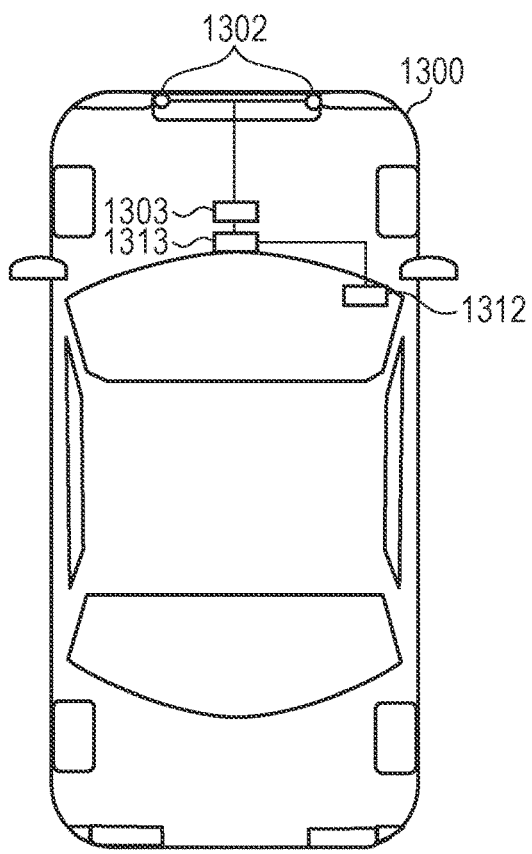
Figure 20D:
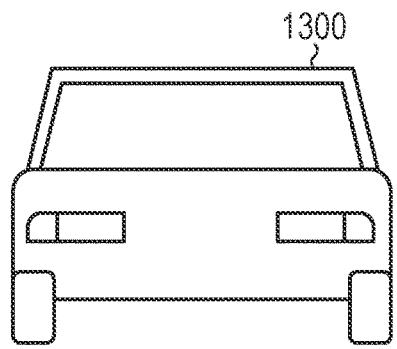

FIG. 20A is a schematic diagram of a photodetection system according to the present embodiment, illustrating an example of a vehicle system and a photodetection system mounted on the vehicle system. FIGS. 20B, 20C, and 20D are schematic diagrams of a movable object according to the present embodiment. The photodetection system 1301 includes a photoelectric conversion device 1302, an image pre-processing unit 1315, an integrated circuit 1303, and an optical system 1314. The optical system 1314 forms an optical image of a subject on the photoelectric conversion device 1302. The photoelectric conversion device 1302 converts the optical image of the subject formed by the optical system 1314 into an electric signal. The photoelectric conversion device 1302 is any one of the photoelectric conversion devices according to the above embodiments.

The image pre-processing unit 1315 performs predetermined signal processing on the signal output from the photoelectric conversion device 1302. The function of the image pre-processing unit 1315 may be incorporated in the photoelectric conversion device 1302. The photodetection system 1301 includes at least two sets of an optical system 1314, a photoelectric conversion device 1302, and an image pre-processing unit 1315, and outputs from the image pre-processing unit 1315 of each set are input to the integrated circuit 1303.

The integrated circuit 1303 is an integrated circuit for use in an imaging system, and includes an image processing unit 1304 including a storage medium 1305, an optical ranging unit 1306, a parallax calculation unit 1307, an object recognition unit 1308, and an abnormality detection unit 1309. The image processing unit 1304 performs image processing such as development processing and defect correction on the output signal of the image pre-processing unit 1315. The storage medium 1305 stores the primary storage of the captured image and the defect position of the captured pixel. An optical ranging unit 1306 focuses a subject and measures distance. The parallax calculation unit 1307 calculates distance measurement information from the plurality of image data acquired by the plurality of photoelectric conversion devices 1302. The object recognition unit 1308 recognizes an object such as a vehicle, a road, a sign, or a person. When the abnormality detection unit 1309 detects an abnormality of the photoelectric conversion device 1302, the abnormality detection unit 1309 issues an abnormality to the main control unit 1313.

The integrated circuit 1303 may be realized by dedicated hardware, a software module, or a combination thereof. It may be realized by FPGA (Field Programmable Gate Array), ASIC (Application Specific Integrated Circuit), or the like, or may be realized by a combination of these.

The main control unit 1313 controls overall operations of the photodetection system 1301, the vehicle sensor 1310, the control unit 1320, and the like. Without the main control unit 1313, the photodetection system 1301, the vehicle sensor 1310, and the control unit 1320 may individually have a communication interface, and each may send and receive control signals via a communication network, for example, according to the CAN standard.

The integrated circuit 1303 has a function of receiving a control signal from the main control unit 1313 or transmitting a control signal or a set value to the photoelectric conversion device 1302 by its own control unit.

The photodetection system 1301 is connected to the vehicle sensor 1310, and can detect a traveling state of the host vehicle such as a vehicle speed, a yaw rate, and a steering angle, an environment outside the host vehicle, and states of other vehicles and obstacles. The vehicle sensor 1310 is also a distance information acquisition unit that acquires distance information to an object. The photodetection system 1301 is connected to a driving support control unit 1311 that performs various driving assist functions such as automatic steering, automatic cruise, and collision prevention function. In particular, regarding the collision determination function, the photodetection system 1301 determines the presence or absence of collision with another vehicle or obstacle based on the detection result of the vehicle sensor 1310. Thus, it is possible to execute the avoidance control when collision is estimated and the start-up control of the safety device when collision occurred.

The photodetection system 1301 is also connected to an alert device 1312 that issues an alarm to the driver based on the determination result of the collision determination unit. For example, when the possibility of collision is high as the determination result of the collision determination unit, the main control unit 1313 performs vehicle control such as applying a brake, returning an accelerator, and suppressing engine output, thereby realizing avoidance of collision and reduction of damage. The alert device 1312 issues an alarm to the user by using means such as an alarm of a sound or the like, a display of alarm information on a display unit screen such as a car navigation system and a meter panel, and a vibration application to a seatbelt and a steering wheel.

The photodetection system 1301 in the present embodiment is capable of capturing an image of the periphery of the vehicle, for example, the front or the rear. FIG. 20B is a schematic diagram of a movable object according to the present embodiment, illustrating a configuration in which an image of the front of the vehicle is taken by the photodetection system 1301.

The two photoelectric conversion devices 1302 are disposed in front of the vehicle 1300. In one embodiment, the center line with respect to the forward/back direction or the outer shape (for example, the vehicle width) of the vehicle 1300 is to be regarded as the axis of symmetry, and the two photoelectric conversion devices 1302 are to be arranged in line symmetry with respect to the axis of symmetry. This makes it possible to acquire distance information between the vehicle 1300 and the object and to determine the possibility of collision. The photoelectric conversion device 1302 is disposed at a position where the driver does not interfere with the field of view of the driver when the driver visually recognizes the situation outside the vehicle 1300 from the driver's seat. The alert device 1312 is disposed at a position where a driver can easily look at.

Figure 21:
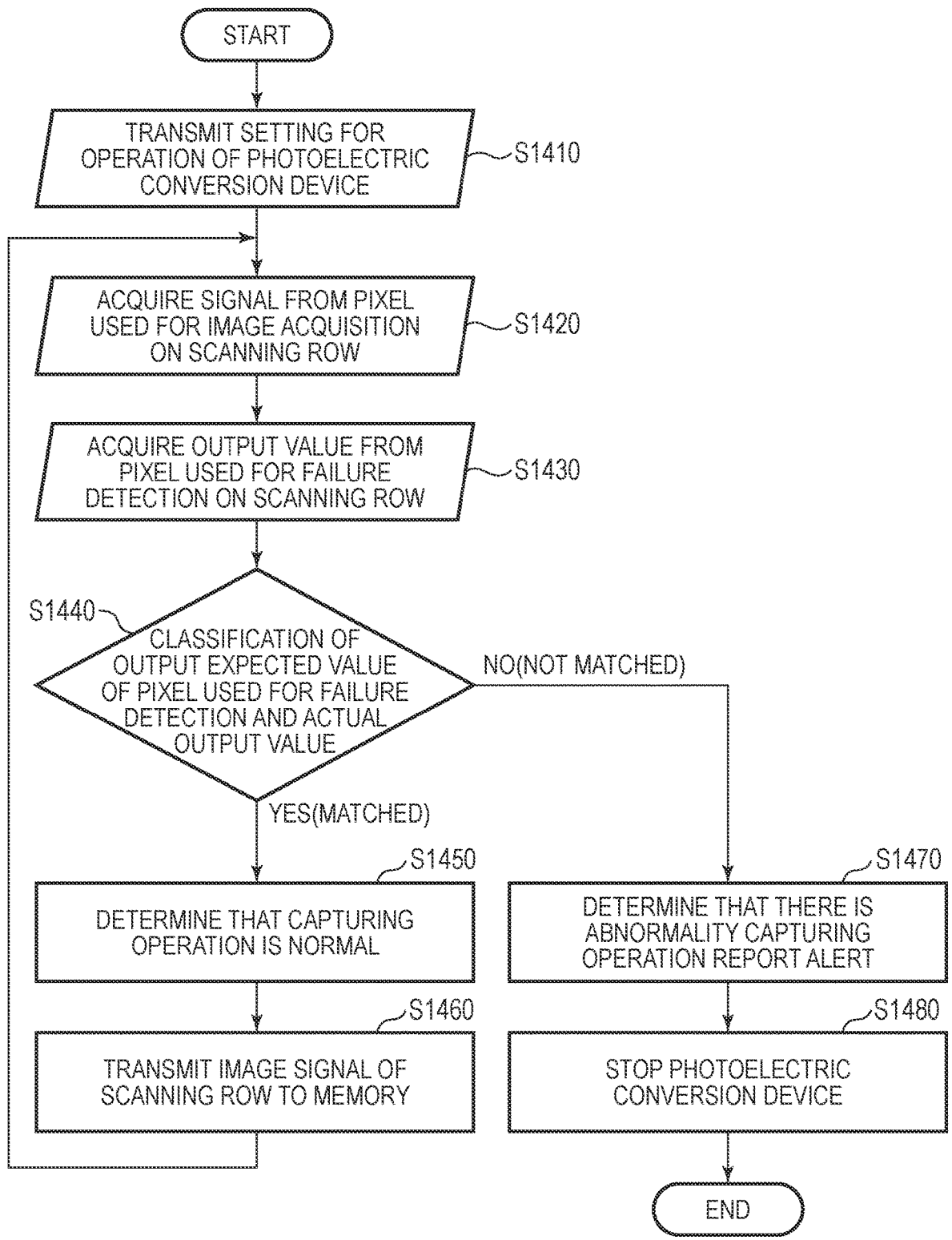
FIG. 21 is a flowchart illustrating an operation of the photodetection system according to the eighth embodiment.

Next, a failure detection operation of the photoelectric conversion device 1302 in the photodetection system 1301 will be described with reference to FIG. 21. FIG. 21 is a flowchart illustrating the operation of the photodetection system according to the present embodiment. The failure detection operation of the photoelectric conversion device 1302 may be executed according to steps S1410 to S1480.

In step S1410, setting at the time of startup of the photoelectric conversion device 1302 is performed. That is, setting information for the operation of the photoelectric conversion device 1302 is transmitted from the outside of the photodetection system 1301 (for example, the main control unit 1313) or from the inside of the photodetection system 1301, and the photoelectric conversion device 1302 starts the imaging operation and the failure detection operation.

Next, in step S1420, the photoelectric conversion device 1302 acquires a pixel signal from the effective pixel. In step S1430, the photoelectric conversion device 1302 acquires an output value from a failure detection pixel provided for failure detection. The failure detection pixel includes a photoelectric conversion element in the same manner as the effective pixel. A predetermined voltage is written into the photoelectric conversion element. The failure detection pixel outputs a signal corresponding to the voltage written in the photoelectric conversion element. Note that steps S1420 and S1430 may be executed in reverse order.

Next, in step S1440, the photodetection system 1301 performs the determination of correspondence between the expected output value of the failure detection pixel and the actual output value from the failure detection pixel. If it is determined in step S1440 that the expected output value matches the actual output value, the photodetection system 1301 proceeds to step S1450, determines that the imaging operation is normally performed, and proceeds to step S1460. In step S1460, the photodetection system 1301 transmits the pixel signal of the scanning row to the storage medium 1305 and temporarily stores the pixel signal.

Thereafter, the photodetection system 1301 returns to the process of step S1420 to continue the failure detection operation. On the other hand, if the output expected value and the actual output value do not match as a result of the determination in step S1440, the photodetection system 1301 proceeds to the process of step S1470. In step S1470, the photodetection system 1301 determines that there is an abnormality in the imaging operation, and issues an alarm to the main control unit 1313 or the alert device 1312. The alert device 1312 displays that an abnormality has been detected on the display unit. Thereafter, in step S1480, the photodetection system 1301 stops the photoelectric conversion device 1302 and ends the operation of the photodetection system 1301.

In the present embodiment, the flowchart that is repeated for each row is exemplified, but the flowchart may be repeated for each plurality of rows, or the failure detection operation may be performed for each frame. The alarm in step S1470 may be notified to the outside of the vehicle via the wireless network.

Further, in the present embodiment, the control in which the vehicle does not collide with another vehicle has been described, but the disclosure is also applicable to a control in which the vehicle is automatically driven following another vehicle, a control in which the vehicle is automatically driven so as not to protrude from the lane, and the like. Further, the photodetection system 1301 can be applied not only to a vehicle such as a host vehicle, but also to a movable object (movable machinery) such as a ship, an aircraft, or an industrial robot. In addition, the disclosure can be applied not only to a movable object but also to an apparatus using object recognition in a wide range such as an intelligent transport systems (ITS).

The photoelectric conversion device of the disclosure may further have a configuration capable of acquiring various kinds of information such as distance information.

Ninth Embodiment

Figure 22A:
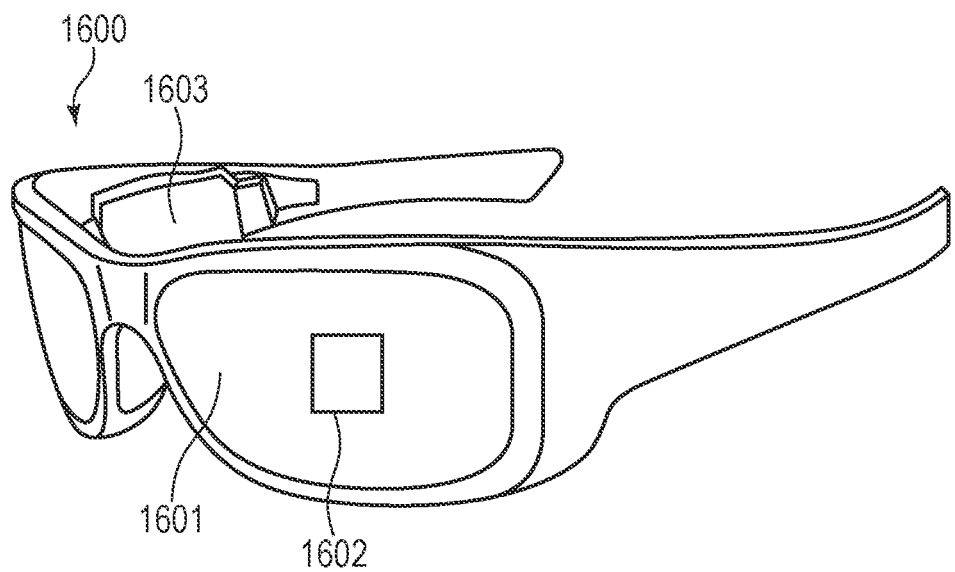
FIGS. 22A and 22B are diagrams illustrating a specific example of an electronic apparatus according to a ninth embodiment.

FIG. 22A is a diagram illustrating a specific example of an electronic apparatus in the present embodiment, and shows eyeglasses 1600 (smartglasses). The eyeglasses 1600 are provided with the photoelectric conversion device 1602 described in each of the above embodiments. A display device including a light-emitting device such as an OLED or an LED may be provided on the back surface side of the lens 1601. One photoelectric conversion device 1602 or a plurality of photoelectric conversion devices 1602 may be provided. A plurality of types of photoelectric conversion devices may be combined. The arrangement position of the photoelectric conversion device 1602 is not limited to that shown in FIG. 22A.

The eyeglasses 1600 further comprises a control device 1603. The control device 1603 functions as a power source for supplying power to the photoelectric conversion device 1602 and the display device. The control device 1603 controls operations of the photoelectric conversion device 1602 and the display device. An optical system for focusing light on the photoelectric conversion device 1602 is formed in the lens 1601.

Figure 22B:
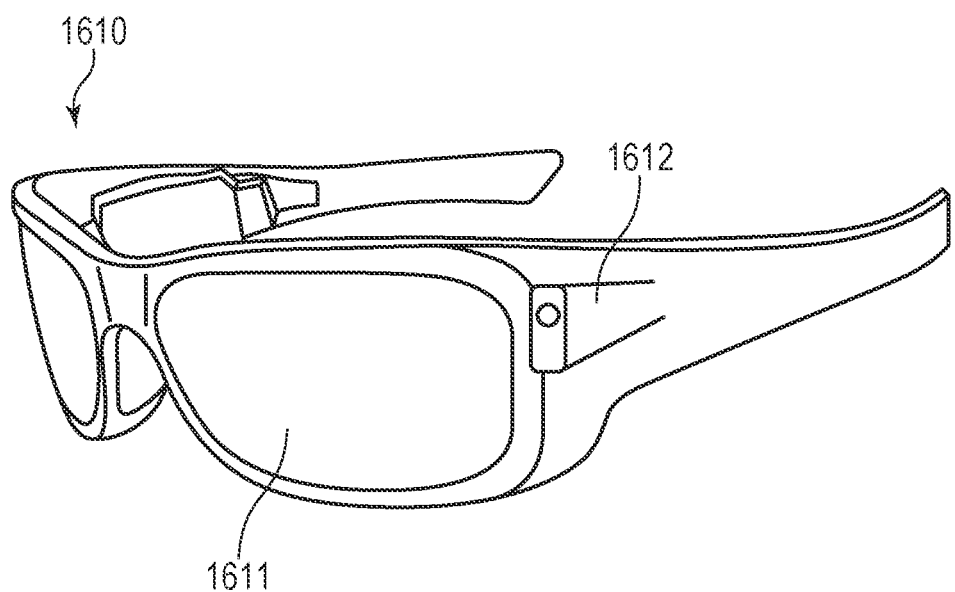

FIG. 22B shows eyeglasses 1610 (smartglasses) according to one embodiment.

The eyeglasses 1610 include a control device 1612, and a photoelectric conversion device corresponding to the photoelectric conversion device 1602 and a display device are mounted on the control device 1612. A photoelectric conversion device in the control device 1612 and an optical system for projecting light emitted from the display device are formed on the lens 1611, and an image is projected on the lens 1611. The control device 1612 functions as a power source for supplying power to the photoelectric conversion device and the display device, and controls the operation of the photoelectric conversion device and the display device. The control device 1612 may include an eye detection unit that detects the eye of the user. Infrared rays may be used to detect the line-of-sight. The infrared light emitting section emits infrared light to the eyeball of the user who is looking at the display image. A captured image of the eyeball is obtained by detecting reflected light of the emitted infrared light from the eyeball by an imaging unit having a light receiving element. The reduction means for reducing light from the infrared light emitting section to the display section in plan view is provided, thereby reducing deterioration in image quality.

The line-of-sight of the user with respect to the display image is detected from the captured image of the eyeball obtained by capturing infrared light. Any known method can be applied to line-of-sight detection using a captured image of an eyeball. As an example, a line-of-sight detection method based on a Purkinier image caused by reflection of irradiation light on the cornea can be used.

More specifically, line-of-sight detection processing based on the pupil cornea reflection method is performed. A line-of-sight of the user is detected by calculating a line-of-sight vector representing the direction (rotation angle) of the eyeball based on the pupil image and the Purkinier image included in the captured image of the eyeball using the pupil cornea reflection method.

The display device of the present embodiment may include a photoelectric conversion device having a light receiving element, and may control a display image of the display device based on line-of-sight information of a user from the photoelectric conversion device.

Specifically, the display device determines, based on the line-of-sight information, a first view area to be gazed by a user and a second view area other than the first view region. The first view area and the second view area may be determined by a control device of the display device, or may be determined by an external control device. In the display area of the display device, the display resolution of the first view area may be controlled to be higher than the display resolution of the second view area. That is, the resolution of the second view area may be lower than that of the first view area.

The display area may include a first display area and a second display area different from the first display area. An area having a high priority may be determined from the first display area and the second display area based on the line-of-sight information. The first view area and the second view area may be determined by a control device of the display device, or may be determined by an external control device. The resolution of the high priority area may be controlled to be higher than the resolution of the areas other than the high priority area. That is, the resolution of an area having a relatively low priority can be lowered.

Note that an Artificial Intelligence (AI) may be used to determine the first view area and the high priority area. The AI may be a model configured to estimate an angle of a line-of-sight and a distance to a target object ahead of the line-of-sight from an image of an eyeball and a direction in which the eyeball of the image is actually viewed as teacher data. The AI program may be provided in either the display device or the photoelectric conversion device, or may be provided in an external device. When the external apparatus has an AI program, the external apparatus can be transmitted from a server or the like to a display apparatus via communication.

When the display control is performed based on the visual recognition, the present embodiment can be applied to smartglasses further including a photoelectric conversion device for capturing an image of the outside. The smartglasses can display the captured external information in real time.

Other Embodiments

The disclosure is not limited to the above-described embodiments, and various modifications are possible. For example, an example in which a configuration of a part of any embodiment is added to another embodiment or an example in which a configuration of a part of another embodiment is substituted is also an embodiment of the disclosure.

The disclosure can also be implemented by providing a program that implements one or more of the functions of the above-described embodiments to a system or device via a network or storage medium, and one or more processors in a computer of the system or device reading and executing the program. It can also be implemented by a circuit (for example, ASIC) that implements one or more functions. It should be noted that all of the above-described embodiments are merely examples of implementation for carrying out the disclosure, and the technical scope of the disclosure should not be construed as being limited thereto. That is, the disclosure can be implemented in various forms without departing from the technical idea thereof or the main characteristics thereof.

According to the disclosure, it is possible to provide a photoelectric conversion device capable of suppressing the circuit scale.

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-008596, filed Jan. 22, 2021, which is hereby incorporated by reference herein in its entirety.

What is claimed is:

1. A device comprising:
   a photodiode;
   a generation circuit that generates a detection pulse based on an output generated by incidence of photon on the photodiode;
   a counter that counts the detection pulse and outputs a count value of a plurality of bits;
   a determination circuit that outputs a determination signal indicating that the count value exceeds a predetermined threshold value based on a transition of any one bit of the counter; and
   a processing circuit that corrects the count value in response to the determination signal,
   wherein the determination circuit determines that the count value exceeds the threshold value when a value of any one bit of the counter transitions from "1" to "0",
   wherein the counter starts counting from "1" of the least significant bit of the counter as an initial value, and
   wherein the processing circuit determines that the count value exceeds the threshold value when all bits of the counter are "0".

2. The device according to claim 1, wherein the determination circuit determines that the count value exceeds the threshold value based on transition of the most significant bit of the counter.

3. The device according to claim 1, wherein the counter further includes a switching circuit that switches one bit to be determined by the determination circuit.

4. The device according to claim 1, wherein the counter stops counting when the count value exceeds the threshold value.

5. The device according to claim 4, wherein the generation circuit includes a quench element that limits a current to the photodiode when the count value exceeds the threshold value.

6. The device according to claim 1, wherein the counter holds the count value of a plurality of bits.

7. The device according to claim 1, wherein the photodiode, the generation circuit, the counter, and the determination circuit constitute a pixel circuit, and
wherein a plurality of the pixel circuits are arranged in a two-dimensional array.

8. The device according to claim 1, wherein a first substrate provided with the photodiode and a second substrate provided with the generation circuit, the counter, and the determination circuit are stacked.

9. A device comprising:
a photodiode;
a generation circuit that generates a detection pulse based on an output generated by incidence of photon on the photodiode;
a counter that counts the detection pulse and outputs a count value of a plurality of bits; and
a determination circuit that outputs a determination signal indicating that the count value exceeds a predetermined threshold value based on a transition of any one bit of the counter,
wherein the determination circuit determines that the count value exceeds the threshold value when a value of any one bit of the counter transitions from "1" to "0", and
wherein the determination signal is added to the count value as a one-bit value.

10. The device according to claim 9, wherein the counter starts counting from "1" of the least significant bit of the counter as an initial value.

11. The device according to claim 10, further comprising processing circuit that corrects the count value in response to the determination signal,
wherein the processing circuit determines that the count value exceeds the threshold value when all bits of the counter are "0".

12. A device comprising:
a photodiode;
a generation circuit that generates a detection pulse based on an output generated by incidence of photon on the photodiode;
a counter that counts the detection pulse and outputs a count value of a plurality of bits; and
a determination circuit that outputs a determination signal indicating that the count value exceeds a predetermined threshold value based on a transition of any one bit of the counter,
wherein the determination circuit determines that the count value exceeds the threshold value when a value of any one bit of the counter transitions from "1" to "0",
wherein the counter stops counting when the count value exceeds the threshold value, and
wherein the generation circuit includes a gate circuit that stops outputting the detection pulse to the counter when the count value exceeds the threshold value.

13. A device comprising:
a photodiode;
a generation circuit that generates a detection pulse based on an output generated by incidence of photon on the photodiode;
a counter that counts the detection pulse and outputs a count value of a plurality of bits;
a determination circuit that outputs a determination signal indicating that the count value exceeds a predetermined threshold value based on a transition of any one bit of the counter, and a processing circuit that corrects the count value in response to the determination signal,
wherein the determination circuit determines that the count value exceeds the threshold value when a value of any one bit of the counter transitions from "1" to "0",
wherein the counter stops counting when the count value exceeds the threshold value.

14. The device according to claim 13, wherein when the count value exceeds the threshold value, the processing circuit invalidates the count value.

15. The device according to claim 13, wherein when the count value exceeds the threshold value, the processing circuit corrects a plurality of bits of the count value equal to or less than the threshold value to "1".

16. The device according to claim 13, wherein when the determination signal is assigned to "0" of the least significant bit of the counter and the counter starts counting from "1" of the least significant bit as an initial value, the processing circuit subtracts a value of "1" from the count value.

17. A system comprising:
the device according to claim 1; and
a processing device that processes a signal output from the device.

18. The system according to claim 17, wherein the processing device generates a distance image representing distance information to an object based on the signal.

19. A movable object comprising:
the device according to claim 1;
an acquisition unit that acquires distance information to an object from a signal output from the device; and
a control unit that controls the movable object based on the distance information.

20. The device according to claim 13, wherein the counter further includes
a switching circuit that switches one bit to be determined by the determination circuit in the counter.

* * * * *